United States Patent
Khanukaev

(10) Patent No.: US 11,070,663 B2
(45) Date of Patent: Jul. 20, 2021

(54) METHOD AND SYSTEM OF IMPLEMENTING AN ADVANCED MULTIFUNCTIONAL DIALER CAPABLE OF MANAGING MULTIPLE CALLING ACCOUNTS

(71) Applicant: Oleg Khanukaev, Netanya (IL)

(72) Inventor: Oleg Khanukaev, Netanya (IL)

( * ) Notice: Subject to any disclaimer, the term of this patent is extended or adjusted under 35 U.S.C. 154(b) by 0 days.

(21) Appl. No.: 16/475,692

(22) PCT Filed: Jun. 11, 2018

(86) PCT No.: PCT/IL2018/050638
§ 371 (c)(1),
(2) Date: Jul. 3, 2019

(87) PCT Pub. No.: WO2019/159160
PCT Pub. Date: Aug. 22, 2019

(65) Prior Publication Data
US 2020/0007675 A1    Jan. 2, 2020

Related U.S. Application Data

(60) Provisional application No. 62/629,720, filed on Feb. 13, 2018.

(51) Int. Cl.
*H04M 1/72466* (2021.01)
*H04M 3/42* (2006.01)
(Continued)

(52) U.S. Cl.
CPC ..... *H04M 1/72466* (2021.01); *H04M 1/2745* (2013.01); *H04M 1/72469* (2021.01); *H04M 3/42289* (2013.01)

(58) Field of Classification Search
CPC ......... H04M 1/72519; H04M 2250/66; H04M 1/72583; H04M 1/72563; H04M 1/27475;
(Continued)

(56) References Cited

U.S. PATENT DOCUMENTS 6,574,486 B1 * 6/2003 Labban ............... H04M 1/2747
455/550.1
8,463,325 B2 * 6/2013 Marui ............... H04M 1/72469
455/566
(Continued)

FOREIGN PATENT DOCUMENTS

WO    WO 2019/159160    8/2019

OTHER PUBLICATIONS

International Preliminary Report on Patentability dated May 26, 2019 From the International Preliminary Examining Authority Re. Application No. PCT/IL2018/050638. (13 Pages).
(Continued)

*Primary Examiner* — Jinsong Hu
*Assistant Examiner* — Rui M Hu

(57) ABSTRACT

A method, system and graphical user interface (GUI) for a mobile device, the GUI including: (a) at least one multifunctional button having at least two activation states: (i) a first state, when actuated, providing a basic function, and (ii) a second state, when actuated, providing an advanced function; whereby each of the activation states is actuated by a different user action; and (b) a plurality of calling accounts, each of the plurality of calling account being logically associated with a subscriber identity module (SIM) card or a direct inward dial (DID) number; wherein the at least one multifunctional button is configured to facilitate selection of one of the plurality of calling accounts in order to perform a communication event.

12 Claims, 12 Drawing Sheets

(51) Int. Cl.
*H04M 1/2745* (2020.01)
*H04M 1/72469* (2021.01)

(58) Field of Classification Search
CPC .... H04L 41/22; H04L 63/0853; H04W 8/183; H04W 88/06; H04W 12/00405
See application file for complete search history.

(56) References Cited

U.S. PATENT DOCUMENTS

| | | | | |
|---|---|---|---|---|
| 8,478,345 B2* | 7/2013 | Marui | H04M 1/724 | 455/566 |
| 8,693,655 B1* | 4/2014 | Chau | H04M 17/10 | 379/201.01 |
| 8,850,340 B2* | 9/2014 | Lee | G06F 1/1626 | 715/764 |
| 8,983,441 B2* | 3/2015 | Baek | H04M 3/543 | 455/417 |
| 9,131,364 B2* | 9/2015 | Howard | H04L 63/0853 | |
| 9,154,601 B2* | 10/2015 | He | G06F 21/34 | |
| 9,247,416 B1* | 1/2016 | Daniel | H04W 8/183 | |
| 9,270,800 B2* | 2/2016 | Lee | H04M 1/72469 | |
| 9,686,672 B2* | 6/2017 | Cao | H04W 8/183 | |
| 10,187,506 B2* | 1/2019 | Kim | H04W 8/183 | |
| 2003/0001816 A1* | 1/2003 | Badarneh | H04M 1/72469 | 345/156 |
| 2005/0261029 A1* | 11/2005 | Yang | H04M 1/724 | 455/564 |
| 2006/0002521 A1* | 1/2006 | Bettis | H04M 3/4938 | 379/88.17 |
| 2006/0234693 A1* | 10/2006 | Isidore | H04M 3/436 | 455/422.1 |
| 2007/0081641 A1* | 4/2007 | Veen | H04M 1/72469 | 379/93.07 |
| 2008/0242356 A1* | 10/2008 | Marui | H04M 1/72469 | 455/566 |
| 2009/0227242 A1* | 9/2009 | Lee | H04M 1/72469 | 455/418 |
| 2011/0314374 A1* | 12/2011 | Chae | H04M 1/72403 | 715/702 |
| 2012/0135715 A1* | 5/2012 | Kang | H04W 4/16 | 455/412.1 |
| 2012/0317208 A1* | 12/2012 | Sousa | G06Q 10/107 | 709/206 |
| 2013/0150013 A1* | 6/2013 | Liu | H04W 8/183 | 455/418 |
| 2013/0311590 A1* | 11/2013 | Chagnon | H04M 1/2757 | 709/206 |
| 2014/0221047 A1* | 8/2014 | Nam | H04M 1/2746 | 455/564 |
| 2015/0017962 A1* | 1/2015 | Howard | H04W 4/60 | 455/418 |
| 2015/0222754 A1* | 8/2015 | Ramprasad | H04W 40/20 | 455/417 |
| 2019/0349741 A1* | 11/2019 | Bellam | H04W 8/04 | |

OTHER PUBLICATIONS

International Search Report and the Written Opinion dated Oct. 4, 2018 From the International Searching Authority Re. Application No. PCT/IL2018/050638. (13 Pages).

* cited by examiner

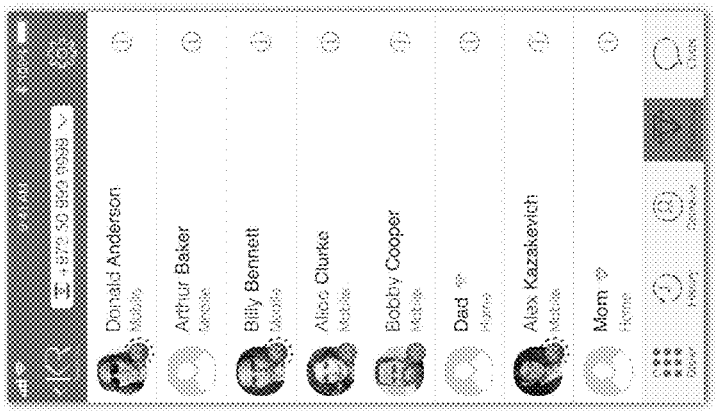
FIG. 10
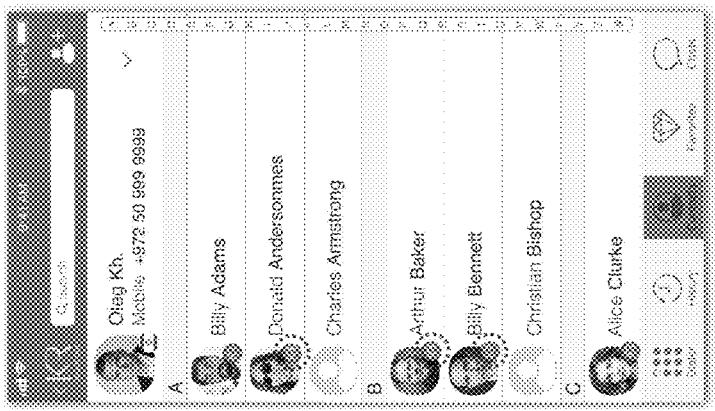
FIG. 9
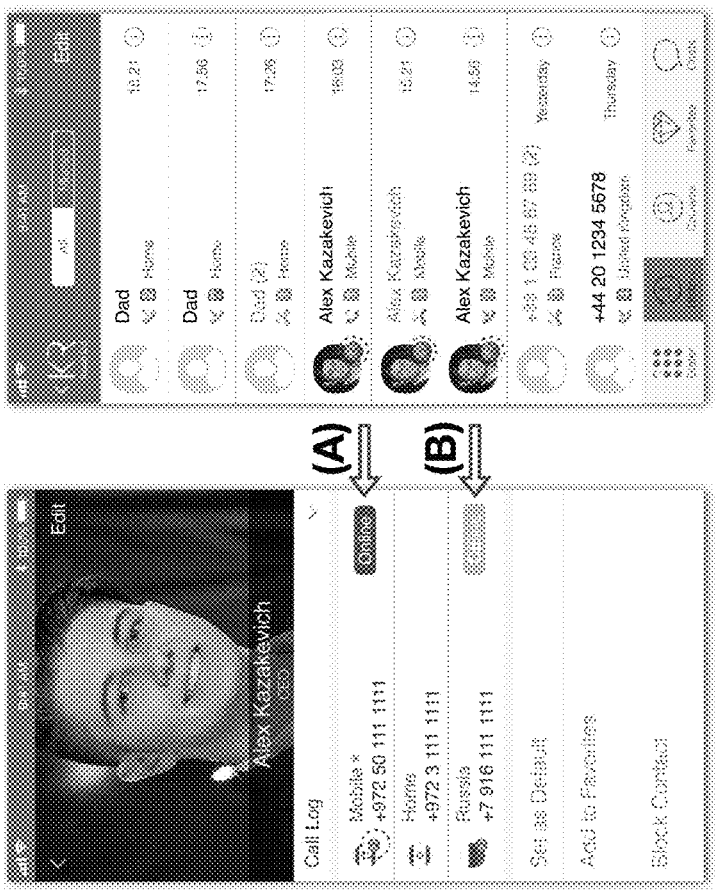
FIG. 8
FIG. 7

METHOD AND SYSTEM OF IMPLEMENTING AN ADVANCED MULTIFUNCTIONAL DIALER CAPABLE OF MANAGING MULTIPLE CALLING ACCOUNTS

RELATED APPLICATIONS

This application is a National Phase of PCT Patent Application No. PCT/IL2018/050638 having International filing date of Jun. 11, 2018, which claims the benefit of priority under 35 USC § 119(e) of U.S. Provisional Patent Application No. 62/629,720 filed on Feb. 13, 2018. The contents of the above applications are all incorporated by reference as if fully set forth herein in their entirety.

FIELD OF THE INVENTION

The present invention relates to a mobile telephone applications and third party dialers that are multifunctional including messaging functionality and capable of handling multiple calling accounts.

BACKGROUND OF THE INVENTION

One of the most common problems with mobile (cellular) communication is that when making or receiving calls on a cellular device especially making overseas (international) calls or when abroad, the user does not know what the expense of the call is at the time.

Furthermore, when people are pressurized and under stress, such as from travel and disorientation of being in a foreign country or in business-related rush, it is difficult to have the presence of mind to use a VoIP application or similar application for voice calls as opposed to cellular calling.

Numerous mobile applications offer services, providing smartphone users with the ability to make roaming call, calls while abroad or local calls at special tariffs. In order to use these services the user needs: (1) to find the application on the smartphone menu, (2) open the application, (3) find and open the calling section, and only after that, (4) make the local call or the international call (roaming call).

However, such applications do not satisfy users, because it is not easy to use these applications and often causes difficulties, for example, when the user needs to make a call when only one hand is available and/or in a rushed and harried state of mind (e.g. the other hand is holding luggage and the user is walking around the airport looking for someone or something or in business-related haste).

Cellular network operators (GSM) provide customers with international, roaming communication services (roaming calls). So in a rush, or when stressed, or both, the user can just make an international call from the native dialer, using a GSM cellular network serviced by the clients SIM card provider. However, the tariff for such roaming calls is usually 5-20 times more expensive than the tariff for local calls. This can be compounded by making an international call while abroad!

As mentioned, users making calls abroad (roaming calls), using the service provided by local Cellular network operators (GSM), in most cases, do not know the price of the call they are making (do not know the price of the tariff), and that does not satisfy the user.

Another common problem is that users (e.g. international travelers) who have a few SIM cards from different countries or issued by different SIM cards operators meet difficulties when trying to make and/or receive a calls using these SIM cards, because changing roaming zones can lead to a rise roaming charges from the side of SIM card providers that is mostly unknown to users and can be significant.

Also, using a few smartphones and/or multiple SIM cards poses a stressful challenge for users for a number of reasons. For example: the user needs to divide his or her attention between a number of phones; it is difficult to carrying numerous phones; for reasons of security or for other personal reasons, it may be necessary to use a certain number/SIM card when communicating with a specific subscriber; it is difficult to remember exactly which SIM card to use in order not to get on unforeseen roaming tariffs. Therefore using multiple SIM cards is really uncomfortable, inconvenient and may cause unpredictable expenses, all of which are unacceptable to the average user.

The technological capabilities of modern smartphones have significantly outgrown the capabilities of the native dialers (default/factory dialer of the mobile device) traditionally used on smartphones and legacy cell phones. The capabilities of native dialers do not allow for managing multiple calling accounts extensively. The term "calling accounts" (and variations thereof) as used herein refers to distinct phone numbers which are registered to the same user and accessed via a single device.

A calling account utilizes the SIM card and/or unique DID number associated with the SIM card as well as all the caller information and contact information stored on that card or associated with that DID number. At present, each SIM card or calling account can be used or accessed separately, but not at the same time. Users either use multiple devices, swap SIM cards in a single device or use devices that have slots for more than one SIM card. In the latter case, the user must go into the Settings menu of the device in order to switch between accounts/cards.

SUMMARY OF THE INVENTION

The present innovation relates to a system and method for mobile telephony and, more particularly, to a system and method for redirecting mobile communications when making calls and receiving calls using the instant IP infrastructure. As a result, both roaming calls and local calls can be made using multiple phone numbers associated with SIM cards and DID numbers—all from a single device.

The instantly disclosed mobile application (also referred to herein by the trade name KALLER) is an advanced multifunctional dialer created as a technological improvement on the native dialers as an alternative thereto. The dialer allows users to exploit capabilities provided by modern smartphones, such as the use of multiple calling accounts, and much more without changing habits users have grown accustomed to with legacy devices and native dialer. Even more importantly the instant application and process affords functionality heretofore absent in legacy devices. Hereinafter the term "calling account" refers to the "user account" that is created by the a device, system, application, etc. by associating phone numbers related to SIM cards and DID numbers with the user account/calling account.

The present invention successfully addresses the shortcomings of the presently known configurations by providing a method, system and service for using multiple phone numbers/"calling accounts" associated with SIM cards and DID numbers in a single device; making and receiving local and roaming phone calls, using multiple "calling accounts";

using different kinds of features such as message and chat services, etc. from multiple "calling accounts".

Furthermore, the instant solution allows a user, when abroad (roaming), to receive calls to his/her mobile number (GSM) at the "home" roaming zone; to make and receive calls e.g. international calls, at a fixed tariff that is clear for users; and to do all of the aforementioned with a single device.

The present invention discloses an innovative telecommunications service suite for: calls over internet (Wi-Fi and Internet over GSM [cellular data usage]), long-distance (roaming) calls service, international communications, IP telephony and marketing.

More specifically, the present invention describes the functionality, the set of capabilities provided by the computer program, the application (hereinafter referred to as The Application, Kaller application, the mobile app and variations thereof) and its associated infrastructure.

The present method allows the user to make roaming calls (calls abroad) in an easy and straightforward manner, just like a regular local call using a smartphone (GSM), by using the native dialer (if integration is supported by the smartphone's operating system) or the instant, innovative [Kaller] dialer. In either case there is no needed to open a complicated, unwieldy application such as SKYPE™ or VIBER™ to make a call.

The present method describes a wide range of technological solutions which may vary depending on the smartphone's hardware and software characteristics.

Alternatively, various solutions are envisioned such as making a call not just by using a native dialer, but using a skin or shell for the native dialer or making a call using the alternative, instant dialer which replaces the native dialer for everyday use, once the alternative, instant dialer Application has been installed on the device.

At present, when making local calls or long distance calls using cellular (SIM, GSM) calling the user can only get information about the cost per minute of the call by visiting the website of the service provider (GSM operator). The instant innovative system and method provide a solution whereby the calls are billed at a fixed, possibly universal tariff. The application recognizes the dialed destination when the number is entered in the dialer and provides on-screen information to the user, including the tariff of the call, ongoing and total call time and actual price of the call that was made.

Furthermore the tariff for some selected countries or for a group of countries can be unified or described as 'universal' which makes the billing price easy (understandable) to recognize. The user does not need to deliberate whether to make the call or not make the call. If the call is a subscriber to subscriber call (K2K) then the call is free or carries a reasonable, clear tariff. A subscriber to GSM/PSTN network recipient likewise carries a reasonable, clear tariff, and in some cases a flat rate for all participating countries.

The invention describes a method that allows a user of the Application to use several DID numbers and phone numbers associated with SIM cards in a single unit (mobile device) with a third-party dialer [Kaller] that manages all the accounts. The single device receives incoming calls to any of those phone numbers. The user can select which number outgoing calls are made from. Recipients will see the selected phone number (this affects tariffs as well, as discussed elsewhere herein).

The Application requires that the smartphone be connected to the internet, either via Wi-Fi, mobile internet (3G, 4G, LTE, etc.), or using any other connection method.

According to the present invention there is provided a graphical user interface (GUI) for a mobile device, the GUI including: (a) at least one multifunctional button having at least two activation states: (i) a first state, when actuated, providing a basic function, and (ii) a second state, when actuated, providing an advanced function; whereby each of the activation states is actuated by a different user action; and (b) a plurality of calling accounts, each of the plurality of calling account being logically associated with a subscriber identity module (SIM) card or a direct inward dial (DID) number; wherein the at least one multifunctional button is configured to facilitate selection of one of the plurality of calling accounts in order to perform a communication event.

According to further features in preferred embodiments of the invention described below the communication event is one of a voice call or a messaging event. According to still further features in the described preferred embodiments According to further features actuation of the first state of the at least one multifunctional button selects a default calling account of the plurality of calling accounts and actuation of the second state of the at least one multifunctional button is configured to present a list of the plurality of calling accounts for selection there from.

According to further features the list further includes a messaging button and wherein selection of the messaging button prompts presentation of a second list including the plurality of calling accounts such that selection of one of the calling accounts from the second list results in initiation of the messaging event to be sent from the selected calling account.

According to further features selection of one of the calling accounts from the list results in initiation of the messaging event to be sent from the selected calling account. Conversely, from a messaging page selection of one of the calling accounts from the list results in initiation of the voice call from the selected calling account.

According to another embodiment there is provided a mobile telecommunications system, including: (a) a telecommunications server in electronic communication with a network of computers; (b) a first subscriber device subscribed to the telecommunications server and configured to effect a communication event there-through; and (c) a target device, wherein the communication event effected between the first subscriber device and the target device through the telecommunications server is billed at a uniform tariff.

According to further features the target device is a public switched telephone network (PSTN) device or a second subscriber device subscribed to the telecommunications server and the first and second subscriber devices have instances of a mobile application installed thereon, the mobile application configured to facilitate voice over internet protocol (VOIP) communications or a messaging event between the first and second subscriber devices through the telecommunications server and the network of computers.

According to further features the mobile application is configured to display a graphic indicator on each of the first and second subscriber devices indicating a respective state of connectivity between each of the first and second subscriber devices, and the telecommunications server.

According to further features a lack of connectivity between the first subscriber device and the telecommunications server is indicated by a first variation of the indicator. Connectivity between the first subscriber device and the telecommunications server is indicated by a second variation of the indicator. Connectivity between the first subscriber device and the telecommunications server and the second subscriber device and the telecommunications server is indicated by a third variation of the indicator. According to further features the third variation of the indicator is displayed on the first subscriber device relative to an activatable user interface element associated with the second subscriber device.

According to further features the mobile application is configured to display a graphic indicator relative to an activatable user interface element associated with the second subscriber device, indicating that the second subscriber device is subscribed to the telecommunications server and has the instance of the mobile application installed thereon.

According to another embodiment there is provided a method for effecting communication events from a mobile device, the method including: invoking a session with a Communications Server using a mobile application installed on the mobile device, the session invocation includes metadata of an Originating subscriber, a target device and an Origination account representation; receiving the session invocation by the communications server; the communications server communicating with a billing server and requesting authorization for the session; receiving authorization for the session and location data from the billing server; and initiating the session with the target device utilizing the location data.

According to further features the target device is a destination subscriber, the Originating subscriber and the destination subscriber each having instances of the mobile application installed thereon.

According to further features the session is initiated via a network of computers or via a carrier service provider when a connection to a network of computers is unavailable.

According to further features the target device is public switched telecommunications network device and the session is completed via a carrier service provider of the target device. According to another embodiment there is provided a method for adding a calling account, the method including: (a) inserting a subscriber identity module (SIM) card into a mobile device having a mobile application installed thereon; (b) comparing, by the application, the SIM card identification to stored SIM card identities; (c) registering a phone number associated with the SIM card as a new calling account on the mobile application; and (d) initiating a communication event from the new calling account.

According to further features the new calling account is set as a default calling account by opening a list of user calling accounts and dragging the new calling account to a first position in the list. According to further features the list is opened from a user calling account bar located at a top position of a page of the mobile application from which the communication event can be initiated.

According to another embodiment there is provided a method for adding a calling account, the method including: (a) purchasing a direct inward dial (DID) number; (b) registering the DID number as a new calling account on a mobile application installed on a mobile device; and (c) initiating a communication event from the new calling account by selecting the new calling account from a list of existing user calling accounts.

According to another embodiment there is provided a method for purchasing and sharing call time, the method including: (a) installing a mobile application on a mobile device; (b) setting up at least one calling account on the mobile application, wherein each of the at least one calling account is associated with a subscriber identity module (SIM) card or a direct inward dialing (DID) number; (c) setting a payment method on the mobile application; and (d) purchasing a minutes package with the payment method on the mobile application, the minutes package providing a predetermined duration and amount of communication events effected from a calling account selected from the at least one calling account.

According to further features the method further includes (e) transferring a minutes package of part thereof to a second calling account selected from the at least on calling account.

According to further features the method further includes transferring a minutes package of part thereof to a second calling account located on a second mobile device.

BRIEF DESCRIPTION OF THE DRAWINGS

Various embodiments are herein described, by way of example only, with reference to the accompanying drawings, wherein:

FIG. 7 is a screenshot of the INFO (contact's profile) page;

FIG. 8 is a screenshots of the HISTORY page;

FIG. 9 is a screenshot of the CONTACTS page;

FIG. 10 is a screenshot of the FAVORITES page;

DESCRIPTION OF THE PREFERRED EMBODIMENTS

Figure 1:
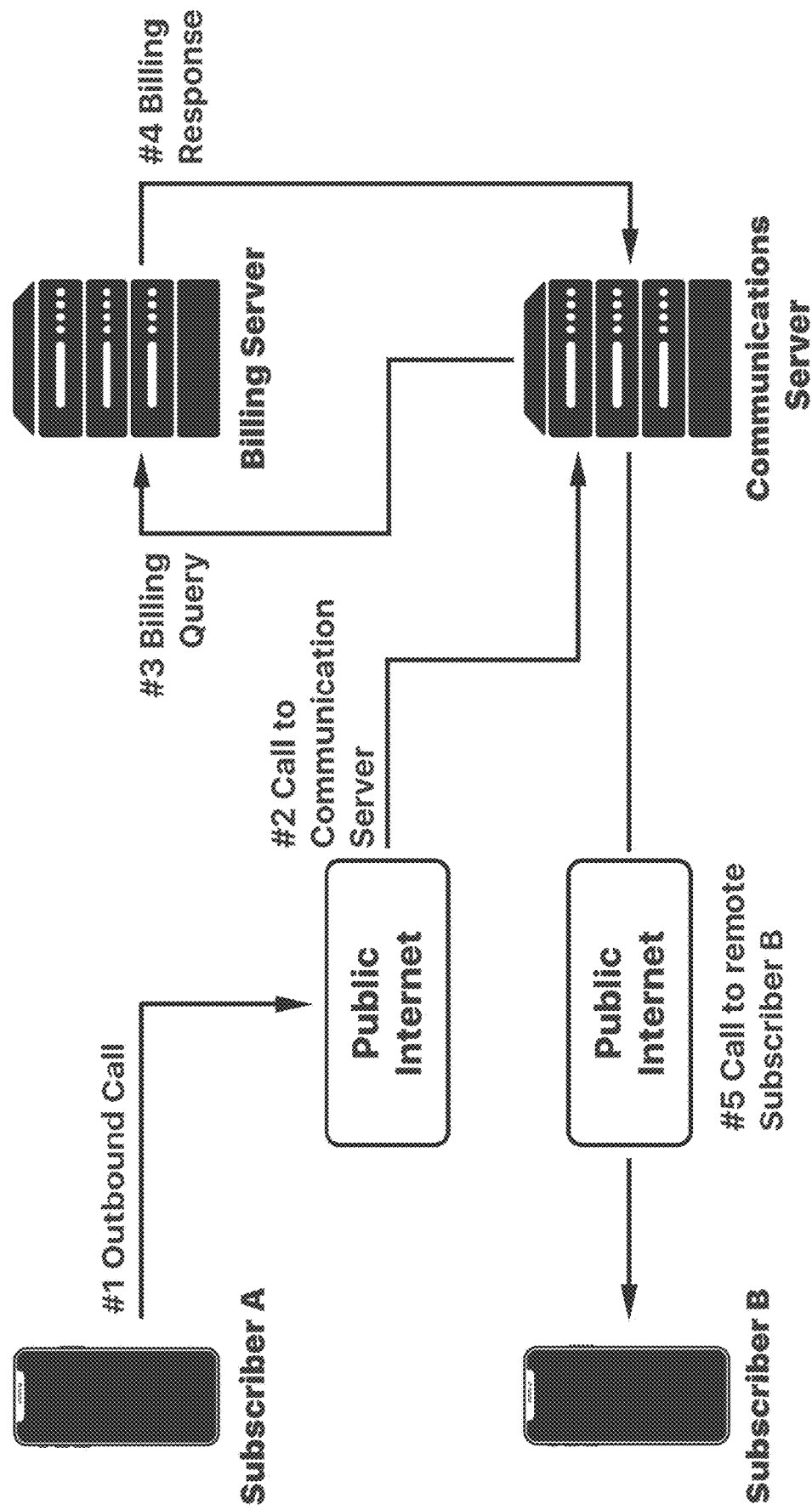
FIG. 1 is a process and method, performed by the applications and platform, to establish a call, between service subscriber devices.

The principles and operation of multifunctional dialer and international IP telephony system according to the present invention may be better understood with reference to the drawings and the accompanying description.

The present innovation includes at least two basic components: the dialer application and the IP telephony infrastructure and process.

Native Dialer Integration Ideally the instant mobile application installs a third-party dialer that supplants the mobile device's native/default/factory-installed/indigenous dialer. Some mobile operating systems allow an "intimate" integration between the mobile application and the native dialer of the device. The objective of said integration is to allow the native/indigenous dialer, to activate the mobile application dialer as required—and thus, providing the user with an improved experience of use—without changing the dialer.

Currently, the "Native Dialer Integration" support is available on Android OS based devices. Should additional devices make such integration available, the instant description is understood to encompass such devices as well.

Upon clicking the "Enter/Dial" button on the native device dialer, an "Intent" is invoked with the device. An Intent is an abstract description of an operation to be performed. An Intent provides a facility for performing late runtime binding between the codes in different applications. Its most significant use is in the launching of activities, where it can be thought of as the glue between activities. It is basically a passive data structure holding an abstract description of an action to be performed.

The Intent's completion can be redirected to an auxiliary application, thus, providing a means of integrating the application directly to the "Native Dialer" experience. Once the number is entered and the activation button clicked—the instant mobile application (Kaller) will be invoked utilizing the pre-selected "account presentation".

For devices/operating systems that do not allow the aforementioned intimate integration the mobile application works in a different capacity. The capabilities of native or indigenous dialers, for example, do not support managing multiple calling accounts extensively, as does the dialer functions of the instant mobile application.

However, the native dialer can be used in a limited manner, such as when making a call using the account that has been set as the default account.

Application Description

The instant mobile application (sometimes referred to herein by the trade name KALLER) is a mobile device application (app), capable of initiating voice sessions (voice calls) from the mobile device, or receiving incoming voice calls to the device. The app is designed for simplicity and ease of integration, enabling full native dialer integration on supported platforms (currently Android only—as mentioned above) and providing high-quality (HD-Voice) voice services, in accordance to the permissible network performance (with respect to the mobile device data transit).

Unlike other mobile applications, KALLER provides a high level of personalization and anonymity, allowing the subscriber to present itself as one of multiple device entities, all from a single hardware device where the switching is done from the mobile application third-party dialer.

Backend Platform Description

I. Voice Switching Platform

The voice switching platform enables the KALLER application to initiate voice based sessions (voice calls) via the switching platform. The switching platform consists of signaling gateways, media processing servers, application servers and additional tools. The switching platform is operational inside a publically available cloud provider, enabling the best cost/performance ratio.

II. Billing and Provisioning

The billing and provisioning platform maintains the KALLER application business logic and user subscription data. The billing and provisioning platform maintains a constant data flow with the voice switching platform, providing the switching platform with the authorization and authentication services as required, while keeping the subscribers' credit and budget properly maintained and tracked.

Methods for Effecting Calls Using Instant Infrastructure

FIG. 1 illustrates a process and method, performed by the application and platform, to establish a call (or message or any other session oriented data exchange), between one service subscriber and another service subscriber (Subscriber to Subscriber call).

The terms "service subscriber" and "subscriber device" (and variations thereof), are used interchangeably herein. The terms "Subscriber A" and "a first subscriber device" (and variations thereof) are used interchangeably herein. The terms "Subscriber B" and "a second subscriber device" (and variations thereof) are used interchangeably herein. The terms "communications server" and "telecommunications server" (and variations thereof) are used interchangeably herein.

In the figure, "Subscriber A" and "Subscriber B" wish to establish a communication session between them, via the communications server. The process runs as follows:

Step #1: "Subscriber A" initiates a session with the "Communications Server" using the instant application installed on the mobile device. The session invocation includes the following meta-data: Originating subscriber, Destination subscriber (also referred to herein as "target device" or variations thereof) and Origination account representation (an alternative representation of the subscriber, replacing the default representation).

Step #2: The session initiation request is received by the "Communications Server".

Step #3: The "Communications Server" communicates with the "Billing Server". The request to the billing server will authorize the request of "Subscriber A", validate the "Origination account representation" as valid and will either authorize the session establishment or not.

Step #4: "Billing server" responds with a valid or invalid response to the authorization request, indicated by Step #3.

Step #5: Utilizing location data provided by the response from the Step #4, the "Communications Server" initiates the session to "Subscriber B", establishing the request session. Call is performed via the "Public Internet" (also termed "network of computers").

Session tear-down is performed when either or the parties requests a session tear-down from the "Communications Server", which then transmits a session tear-down request to all connected parties of the active session.

Figure 2:
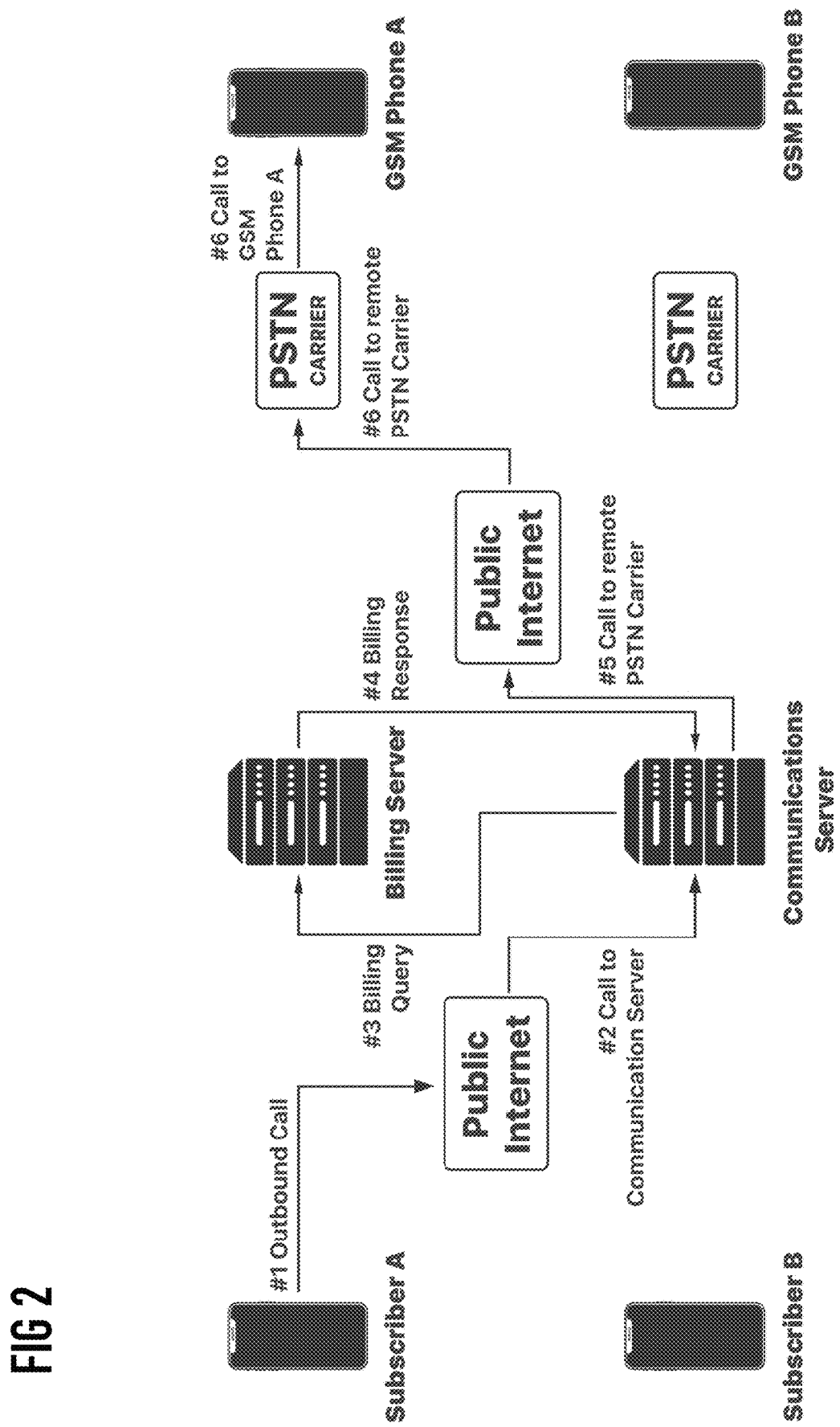
FIG. 2 is a process and method, performed by the application and platform, to establish a call, between a service subscriber device and a non-subscriber device.

FIG. 2 illustrates a second process and method, performed via the application and platform to establish a call (or message or any other session oriented data exchange), between a service subscriber and a remote device that is not connected to the application service and is located on another network (Subscriber to world/non-Subscriber). The telephony communication/exchange may be voice, video, messaging or another type of session payload, as provided by the various PSTN/Mobile carriers.

In the Figure, "Subscriber A" and "GSM Phone A" (also referred to herein as a PSTN device) wish to establish a communication session between them, via the communications server. Session initiation starts with the application service subscriber and is completed by the remote, non-subscriber device. The process runs as follows:

Step #1: "Subscriber A" wishes to initiate a session with "GSM Phone A". "Subscriber A" initiates a session with the "Communications Server" using the instant application installed on the mobile device. The session invocation includes the following meta-data: Originating subscriber, Destination subscriber and Origination account representation (an alternative representation of the subscriber, replacing the default representation).

Step #2: The session initiation request is received by the "Communications Server". Step #3: The "Communications Server" communicates with the "Billing Server". The request to the billing server will authorize the "Subscriber A" request, validate the "Origination account representation" as valid and will either authorize the session establishment or not.

Step #4: "Billing server" responds with a valid or invalid response to the authorization request, indicated by Step #3.

Step #5: Session initiation request is transmitted to the remote carrier that is providing services for "GSM Phone A" (a non-subscriber).

Step #6: Session setup with the "GSM Phone A" is completed via the carrier service provider.

Session tear down is performed by either of the parties requesting a session tear-down from the "Communications Server", which then transmits a session tear-down request to all connected parties of the active session.

If the application detects that no active Internet connection is available, it will either indicate as such, or re-direct the outbound call back to the native dialer (on supported platforms).

Figure 3:
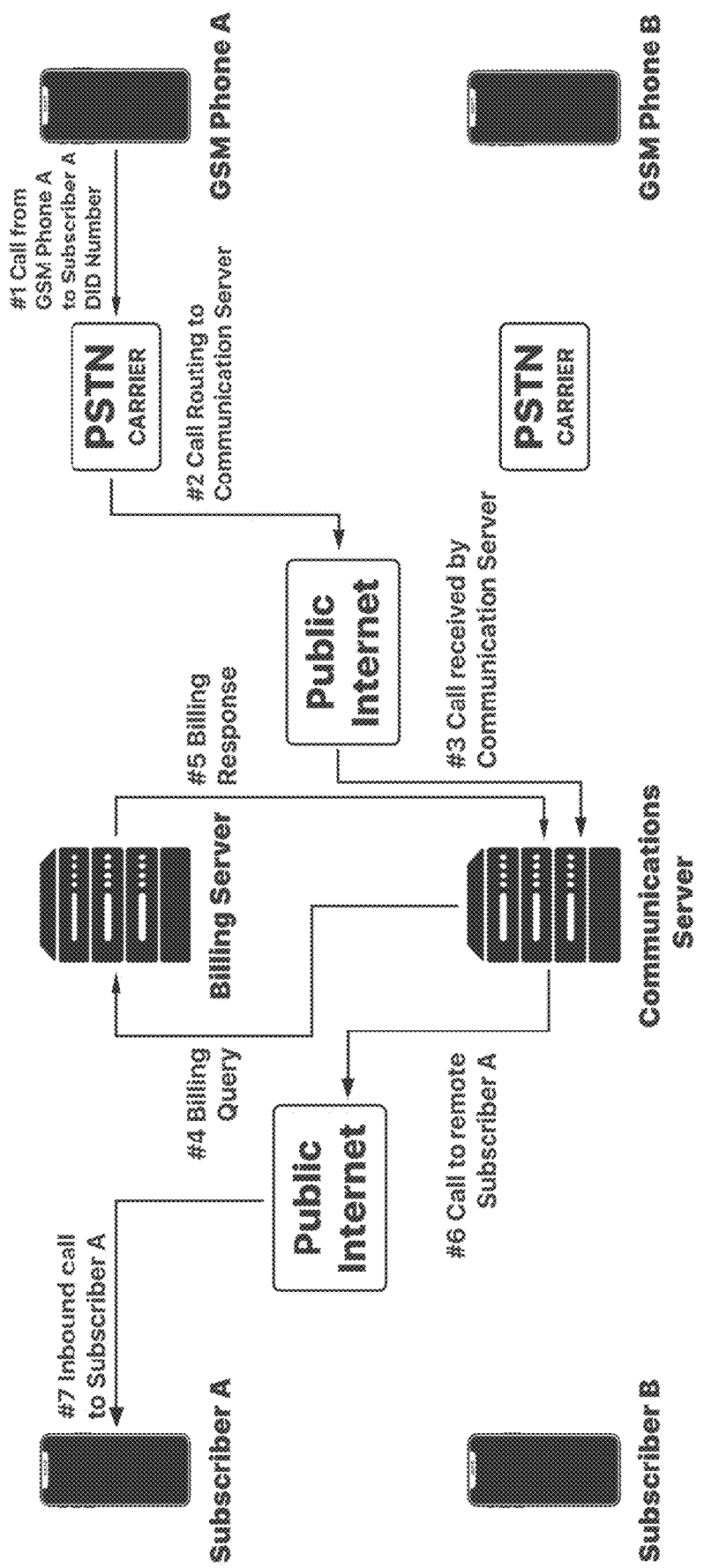
FIG. 3 is a process and method, performed by the application and platform, to establish a call, between a non-subscriber device and a service subscriber device.

FIG. 3 illustrates a process and method, performed by the application and platform, to establish a call (or message or any other session oriented data exchange), between a service subscriber and a remote device that is not connected to the application service and is located on another network (World/non-Subscriber to Subscriber). The telephony communication/exchange may be voice, video, messaging or another type of session payload, as provided by the various PSTN/Mobile carriers.

In the Figure, "Subscriber A" and "GSM Phone A" wish to establish a session between them, via the communications server. The session is initiated by a remote, non-subscriber (no application installed) device. The process runs as follows:

Step #1: "GSM Phone A" wishes to initiate a session with "Subscriber A". "GSM Phone A" initiates a session to one registered origination presentations (a single subscriber may have multiple representations, depending on billing allowance, country of origin, etc) of "Subscriber A".

Step #2: The session initiation request is sent by the "Communications Server". Step #3: The session initiation request is received by the remote "Communications Server".

Step #4: The "Communications Server" communicates with the "Billing Server". The request to the billing server will authorize the session initiation request from "GSM Phone A" to "Subscriber A". Authorization is based upon the "Subscriber A" registered origination presentation. The response must include the remote device for "Subscriber A", the "Subscriber A" platform wide identifier and the origin of the session—the "GSM Phone A"

Step #5: "Billing server" responds with a valid or invalid response to the authorization request, indicated by Step #4.

Step #6: Session initiation request is transmitted to the remote application device, installed on "Subscriber A" mobile device.

Step #7: Session is initiated to the device with the mobile application.

Session tear down is initiated by either party. A session tear-down request is sent from either of the parties to the "Communications Server". The Communications Server then transmits a session tear-down request to all connected parties of the active session.

Figure 4A:
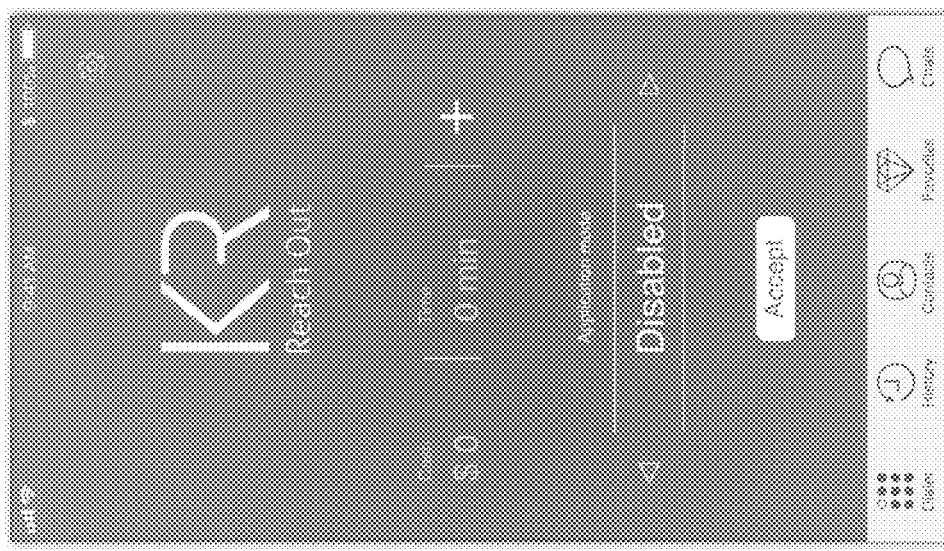
FIG. 4A to 4C are screenshots of the operation mode selection page, in different modes.
Figure 4B:
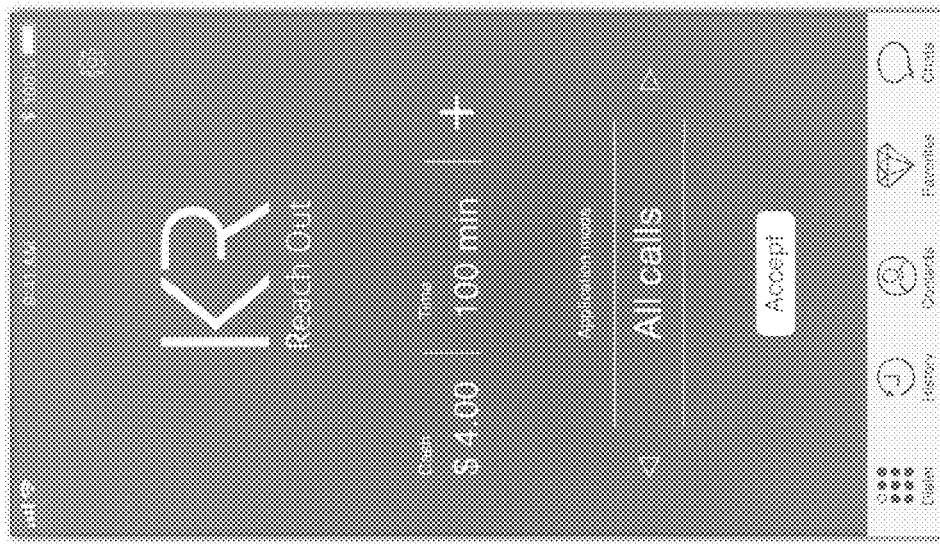
Figure 4C:
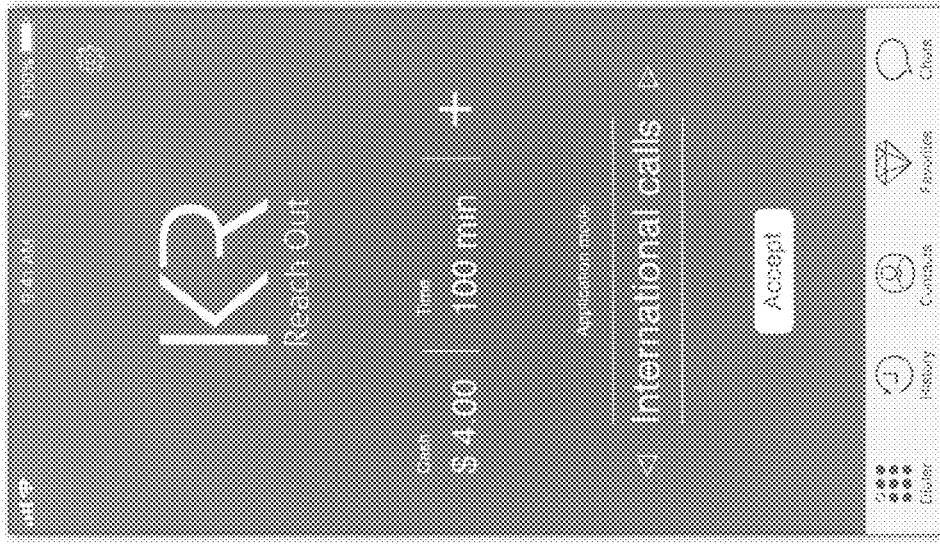

Application Activity—Operation Mode Upon successful application initiation (post registration and signup), the application will present the user with an operation mode screen. FIGS. 4A to 4C are screenshots of an exemplary operation mode selection screen, with different options selected. The application may be invoked in several modes of operation, in accordance to the below:

1. International only—The application will receive calls and will allow outbound calls to be made to international destinations. This mode is best used when operating within the country of origin of the subscriber's SIM card. FIG. 4A is a screenshot of the operation mode selection page, with the "International calls" option selected.

2. All calls—The application will receive calls and make outbound calls to all destinations. This mode is best used for roaming users. FIG. 4B is a screenshot of the operation mode selection page, with the "All calls" option selected. 3. Disabled—The application is disabled completely. Incoming and outgoing calls are not available via the application. FIG. 4C is a screenshot of the operation mode selection page, with the "Disabled" option selected.

Originating Account Representation Modus Operandi

After discussing some of the use cases (subscriber to subscriber, subscriber to non-subscriber, non-subscriber to subscriber) for the present system and application, there is discussed hereafter the dialer application itself, in greater detail. In a world where mobility is crucial and privacy is practically nonexistent, being able to maintain multiple, separate "mobile personas" is a desired requirement. The instant, innovative mobile application provides the ability to originate outgoing calls and receive incoming calls utilizing multiple incoming/outgoing identities.

To facilitate such functionality, the mobile application provides a means of creating "multiple personas" on a single device. The user is able to preset a given persona (calling account) for a specific number (outgoing or incoming) or select one ad-hoc.

Figure 5A:
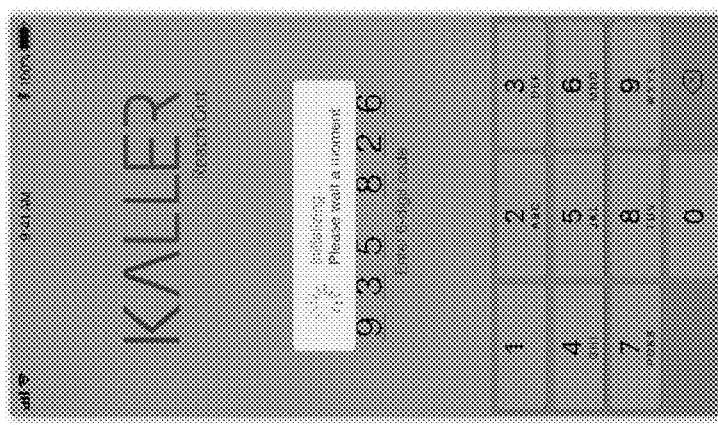
FIG. 5A to 5D are screenshots of the procedure for adding a calling account.
Figure 5B:
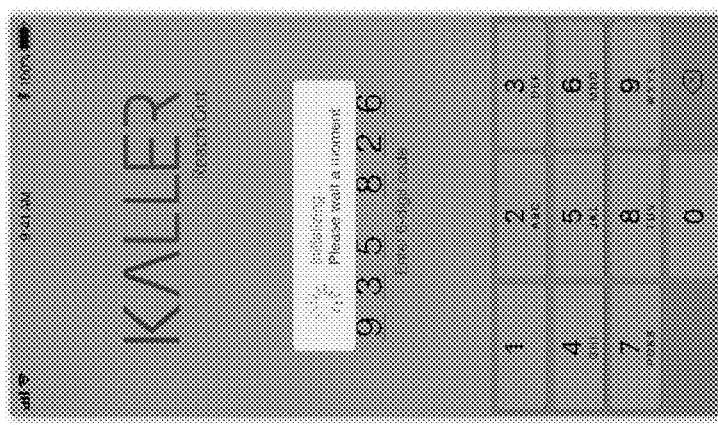
Figure 5C:
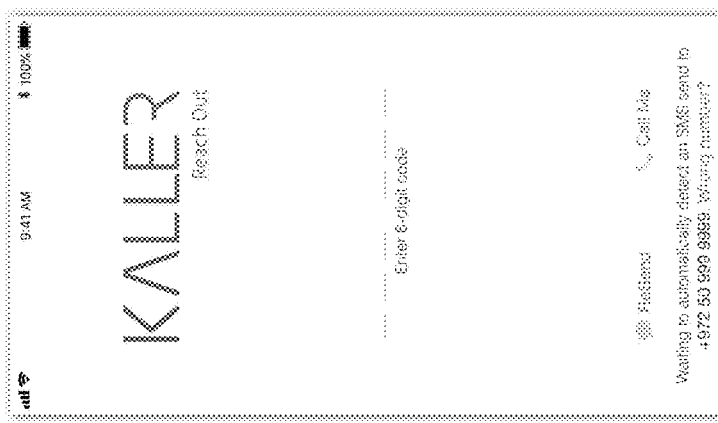
Figure 5D:
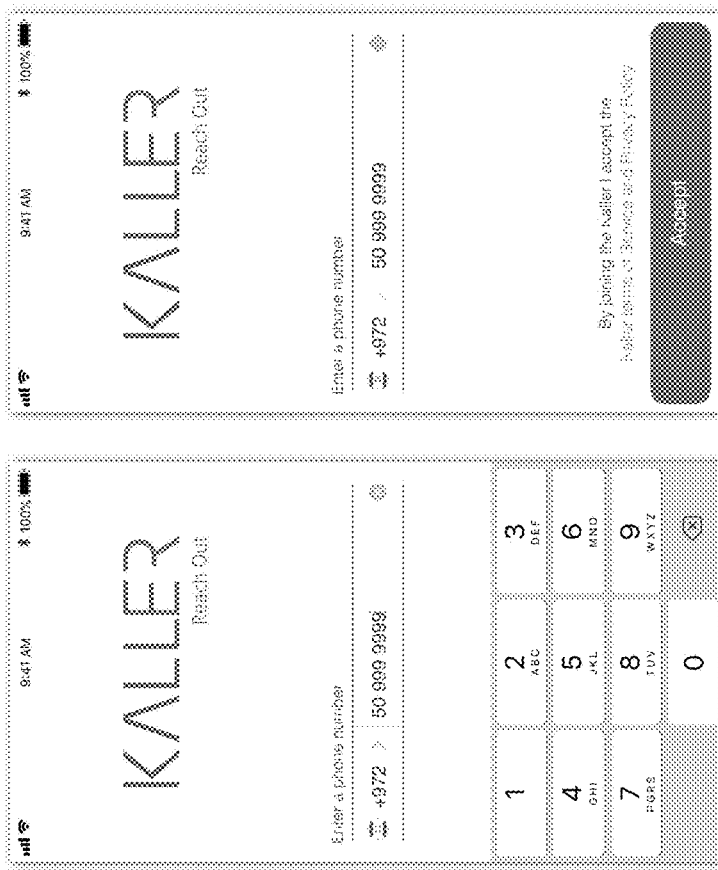

Upon activating the application, the application startup procedure will validate the user phone number and will create this number as the primary application persona (account). FIGS. 5A to 5E are screenshots of the procedure for adding a calling account and setting a default calling account. FIG. 5A is a screenshot of the creation of persona (+972 540000000). The country is selected as Israel. The phone number is based on the installed SIM card. Once the full number is input, the user is invited to accept the Terms of Service etc. FIG. 5B is a screen shot of the confirmation screen. Once the user has agreed to the terms and policy, a code is sent to the phone number (e.g. via SMS) that has just been added. Receipt of the code verifies that the number is a real number and that the user is in possession of the SIM card/number. FIG. 5C is a screenshot of the verification page, where the application requests a verification code. FIG. 5D is a screenshot of the splash/pop-up screen showing a notification that the code was received and the new number is being initialized.

Figure 5G:
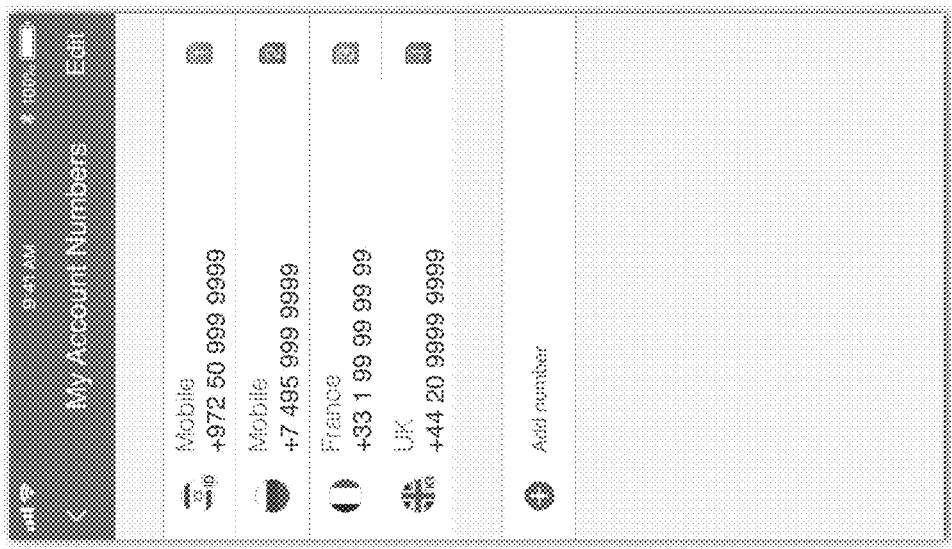
FIG. 5E to 5G are screenshots of the procedure for naming a user calling accounts and setting a default calling account.
Figure 5F:
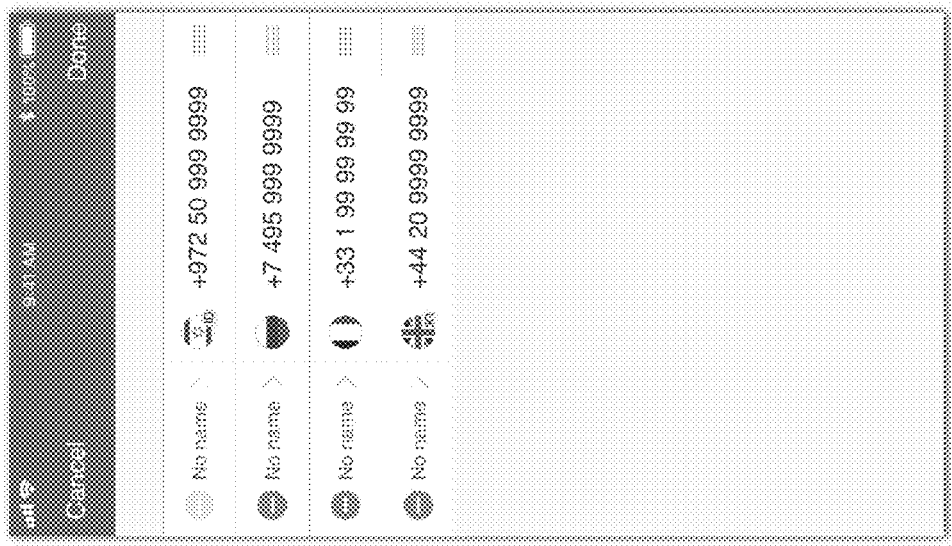
Figure 5E:
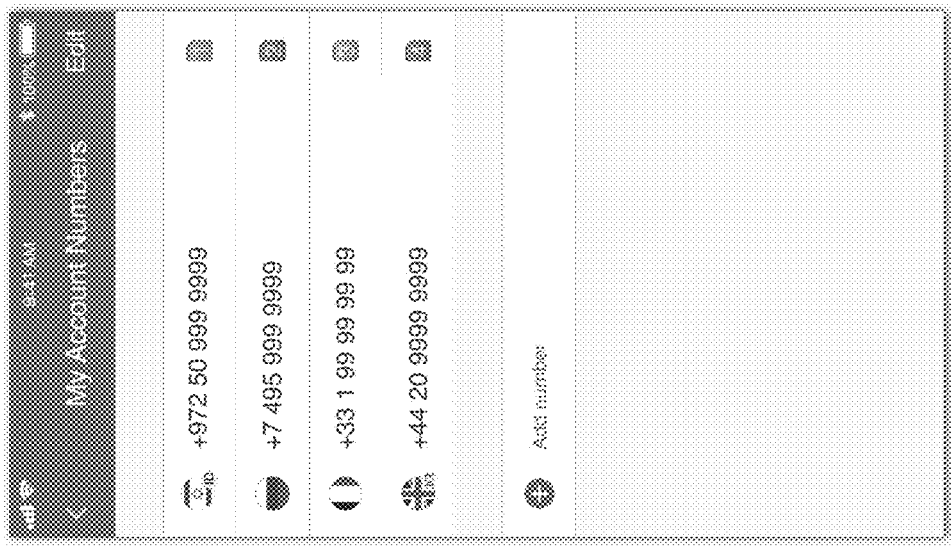

FIG. 5E, 5F, 5G is a screenshots illustrates representing a user's calling accounts, method providing a names for the used calling accounts and method of setting up a default calling account. Settings menu, "My account numbers" page (see FIG. 5E) shows the list of the calling accounts, phone numbers, that managed by the app. FIG. 5F is a screenshot of the edit page allowing to name or modify the names of the calling accounts. FIG. 5G is a screenshot of the list of user calling accounts after when been named. From the Settings/ "My accounts numbers" menu (FIG. 5E, 5F), the user can select any one of the accounts and set that account as default by dragging it to the top of the list.

Figure 6A:
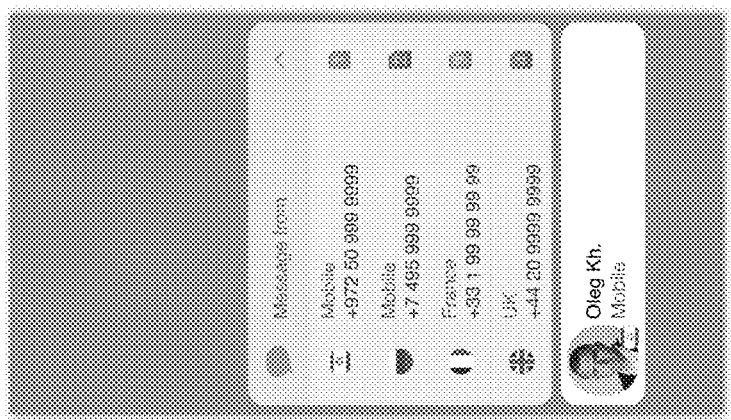
FIG. 6A, 6B are screenshots of the app DIALER with "calling accounts" bar and "user calling accounts" sub menu, when "calling accounts" bar affecting.
Figure 6B:
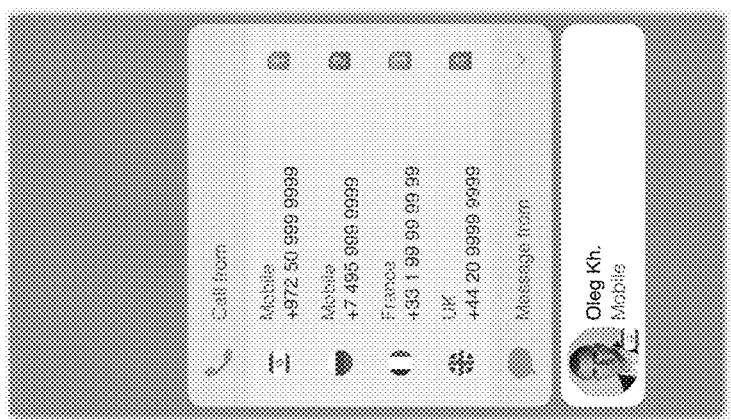

FIG. 6A is a screenshot of the app dialer with a number queued to be dialed. Once inside the application dialer, the default account will appear on the "user calling account" bar. The bar shows the currently selected default persona (account), which will be used upon initiating a call from the dialer (or other parts of the application). When additional personas (accounts) have been created, an alternative default persona (account) can be selected or an ad-hoc selection of the persona (account) can be performed. Additional accounts can be added by installing a new SIM card or purchasing of a new incoming DID number. The calling account can be selected from the drop-down menu that appears when the "user calling account" bar pressed. FIG. 6B is a screenshot of the dialer with the user calling account number drop-down menu open.

It is made clear that the representations disclosed heretofore and elsewhere in this document are merely exemplary, and other colors, icons and methods of representation can be used to substitute those disclosed. Any number of techniques for providing easily recognizable information to differentiate activity or SIM cards/DID numbers can be provided. A name, number, color, icon, or combinations thereof can be associated with a particular SIM card or DID number (calling account). For example, a local calling account can be associated with one color (e.g., green), while a foreign calling account can be the colors of the flag of that country or something to that effect. Tiles for the local calling account can be portrayed in the local color, as well as background call notifications, lock screen count, and the accent color for any application involving the local account.

Once the account had been selected, the account caller ID presentation is preset and will become the outbound call presentation for the call. Thus, enabling the user to present multiple personas (accounts) to external devices, while still using the same device and application, thereby eliminating the need for multiple devices and multiple SIM cards.

In order to properly support multiple personas, the application requires a methodology to add new personas. New personas can be added by one of the following methods:

1. Replacement of the existing SIM card with a new SIM card—the application will identify such a change and will automatically invoke "Origin Account Representation Modus Operandi".

2. Purchasing of a new DID number, via the application settings menu.

SIM Card Addition Modus Operandi

Once a new SIM card is inserted in the mobile device and the application is launched, the following process will be invoked:

1. The application will verify the SIM card identification, in comparison to the stored SIM card identities.

2. If the SIM card identification is stored on the device, the application will continue as usual.

3. If the SIM card cannot be identified as matching an existing calling account, the application will deem the SIM as a new SIM card, and will invoke the normal initiation procedure for a new calling account, as described above in Origin Account Representation Modus Operandi.

4. Once the initiation procedure is complete, the application user will have the ability to use two or more personas, assigned to his SIM cards. The activation of the persona can be performed by presetting the persona account as the default account. Alternatively, the account/persona can be selected via a shortcut key (or key combination) or by a special, multifunctional button touch such as a "hard press" (mobile device touch screen sensors register that an unusual amount of pressure is being applied to the screen; this is interpreted by the device as a hard press) which the application recognizes and performs the associated functionality (e.g. switch account, in this exemplary case).

In other embodiment adding a new calling account, that is associated with the new SIM card phone number can be implemented by manually adding a new phone number associated with a new SIM card to the list of user calling accounts, and inputting a security code, also manually, that can be received by the KALLER APP that is installed on the smartphone that uses the SIM card you want to add.

DID Purchase Modus Operandi

Once an application is fully functional, the subscriber may decide to purchase additional DID numbers. Direct Inward Dialing (DID), is a telecommunication service offered by telephone companies to subscribers who operate a private branch exchange (PBX) system. DID numbers provide a "virtual persona", without requiring a physical SIM card to be installed. Invocation of such DID purchase is performed from the mobile application settings menu, and is completely parallel to the applications normal operations.

Incoming Calls Management Modus Operandi

There is provided a method for managing all incoming calls into the mobile application (in supported countries and by supporting carriers around the world). In order to support this feature, the subscriber must first provide access to the device MMI (Man Machine Interface) (by granting the relevant security permission), which will then forward the calls from the subscriber's normal SIM card to the Kaller assigned, incoming DID number. This feature may not be supported in some countries or by some carriers. This is a network specific feature which requires verification on a network by network basis.

Upon finalizing the setup procedure (single SIM or multi-SIM), the following steps will take place:

1. The platform will allocate a new virtual incoming DID number, in the same country of origin as the inserted SIM card.

2. Once the number had been allocated, the application will issue an MMI/USSD code, to forward all calls from the mobile device phone number to the incoming DID number.

Once the forward is complete, all incoming calls will be directed to the Kaller application. If the KALLER application service identifies loss of Internet connection for a period longer than a predefined X number of minutes, it may disable the call forwarding and only re-establish the call-forwarding once the Internet connectivity is correctly engaged.

The instant mobile app (Kaller app) is designed as an advanced multifunctional dialer and is created as a technological improvement of the native dialer and as an alternative thereof. The mobile app allows users to use the capabilities provided by modern smartphones, such as the use of multiple calling accounts and much more, without changing habits. In fact, the app has been structured specifically so as not to change the habits developed by using the native interfaces. One of the main objectives of the instant innovative application is to build on the familiarity of the user (with native dialers) and improve the ease-of-use of the application.

Unlike other applications, the instant application enables the use of multiple accounts in the same application, easily and simply switching between accounts as desired. Because the capabilities of native dialers do not allow the user to manage multiple accounts extensively, the Kaller app was developed within the framework of execution and use of native dialers, and wherever possible, without creating new interfaces and buttons that unfamiliar to users.

Setting a Default Calling Account, Preferred Embodiment.

If the application user has a few calling accounts/a few assigned phone numbers, user able to set one of the accounts as the default number by using one of the methods described hereafter.

According to the preferred embodiment, there is an option to change a default outgoing calling account by using a "User Calling Account" bar, as discussed with regards to FIGS. 6A and 6B.

The bar shows the currently selected default calling account, which will be used upon initiating a call. The calling account can be selected and settled up as a default calling account from the drop-down menu that appears when "user calling account" bar clicked. FIG. 6B is a screenshot of the dialer with the user calling account number drop-down menu open.

In one exemplary configuration of the application, the bar is found on the DIALER, CONTACTS, FAVORITES; pages (see FIGS. 6A, 9, 10). The "user calling account" bar can looks vary, for example on a CONTACTS page (see FIG. 9) the bar is implemented differently, as a panel on the top of the page, indicating a user's avatar, name and previously settled default calling account with "V" arrow on side. In other embodiments the "User Calling Account" bar can be presented on any pages and screens.

Presented method of managing and using a multiple calling accounts by implementing a "User Calling Account" bar is a new technological approach. Currently native dialers, integrated to smartphone's operating systems as Android, iOS or any others, are not able to handle multiple calling accounts. So method can be used much wider than in scope of described embodiments, e.g. can be implemented in a new generation of the native dialers as well.

Multifunctional Interface Buttons

In some embodiments of the application, one or more of the interface buttons are multifunctional. The terms "interface buttons", "multifunctional buttons" and variations thereof, are used herein to denote an activatable user interface element. While the term "button" is used, this is merely exemplary. The interface element can take the form of tiles, buttons, areas, items in a list, shapes, sliders, or the like presented as part of a graphical user interface. The user interface element can include text and/or an icon to indicate functionality.

Some of the buttons presented on the Kaller app screens/pages are multifunctional meaning that the button is capable of producing different functions when actuated in different ways by the user. In preferred embodiments, a quick tap or touch on an "enabled" button produces a "base" action. A long press on the same "enabled" button produces a different action, an "advanced" action. However, the aforementioned is merely exemplary. Alternatively or additionally, user input indicative of selection (e.g., of the activatable user interface element) can be performed in any exemplary manner, so as, but not limited to a tap, hover, or other touch gesture. Other systems can support clicking, hovering, voice activation, blinking, winking, and the like.

One exemplary use of a multifunctional button, which takes advantage of one of the unique features of the instant innovation, is the selection of the outgoing account. For example, if a user performs a short tap/click on a contact number, the app dialer will initiate the call from the default account. However, if the user presses down for a relatively longer amount of time, the app will invoke an advance function and a pop-up menu will present with a list of the calling accounts with a title "Call from".

According to other embodiments, exemplarily, the base or basic function is invoked by a short tap/press (as above), and the advanced function is invoked by a deep press (known as a 3D touch technology used in some iPhone devices). In other embodiments, the advanced function is invoked by a double tap/click of the button. In still more embodiments, the advanced functionality of the button is invoked by sliding the button (or finger over the button) up/down/left/right.

In other embodiments, a "character/specific button" that can be located on the panels, screen fields and/or menus is used to initiate the basic and advanced actions. Such a "character/specific button" button can be implemented in different ways, such as, but not limited to, intuitively prompting/suggesting/presenting two different ways of actuating the button(s) to initiate base and advanced actions.

Depending on the smartphone's technological capabilities to recognize any other, known but not mentioned intents/actions, the given device may be able to initiate base and advanced actions of multifunctional buttons such capabilities are used. These intents/actions can additionally or alternatively be used in other embodiments disclosed here. In other embodiment, if voice control/recognition is enabled on the smartphone, the user can provide voice commands that are predefined by the user or the system, to initiate base and advanced actions. In some embodiments a combination of the aforementioned invocation methods are uses to provide a single button with more than two functions or for different buttons on the same or different page/screen/menu.

Figure 6C:
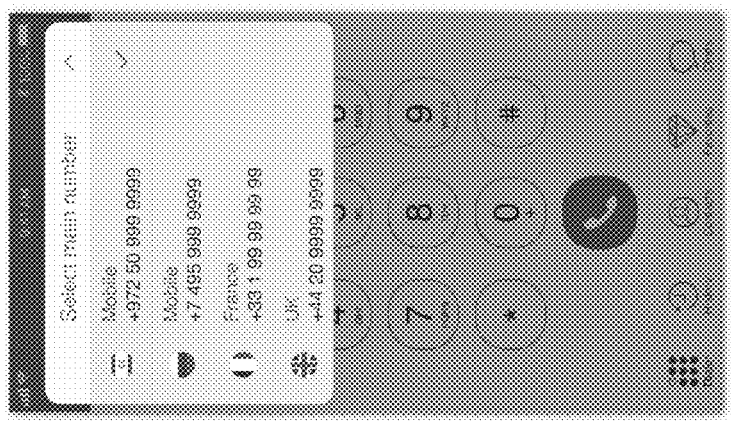
FIG. 6C to 6D are screenshots of the "Call from" and "Message from" pop-up menus.
Figure 6D:
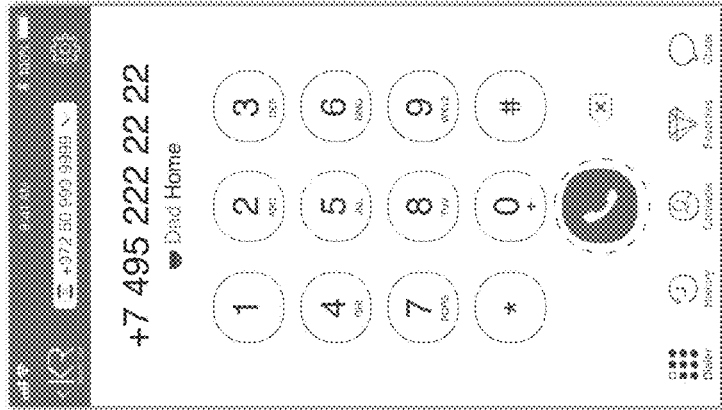

Referring back to the example of dual function when pressing on a contact, FIGS. 6C and 6D are examples of "advanced" functions and "advanced messaging" functions that can be invoked by a multifunctional button. FIG. 6C is a screenshot of a "Call from" pop-up menu. The user selects the desired calling account from the menu. The selected account will present as the call origin on the receiving device, as described elsewhere.

In some embodiments, as exemplarily depicted in FIG. 6C, the "Call from" menu includes the option "Message from" on the list of the pop-up menu. If the user actually wants to initiate a messaging communication, and not initiate a call, the user selects the "Message from" button and a second menu will pop up with the same list of calling accounts.

The terms "message", "messaging", "messaging communication", "messaging communication event" and variations thereof are used herein to denote any type of communication that is not a voice call. This includes, but is not limited to, text chats, video chats, video calls, image transferring and sharing, etc.

FIG. 6D is a screenshot of a "Message from" pop-up menu. If the user selects an account then the user will be able to initiate a messaging communication to the selected contact instead of a voice call.

Presented method of managing and using a multiple calling accounts by implementing a "multifunctional" buttons is a new technological approach.

Currently native dialers, integrated to smartphone's operating systems as Android, iOS or any others, are not able to handle multiple calling accounts. So method can be used much wider than in scope of described embodiments, e.g. can be implemented in a new generation of the native dialers as well.

Presented method of "using a multifunction button to manage multiple calling accounts" is a universal, so in other embodiments:

can be used by any device, system, application, etc;
can be used on any pages, screens or interfaces;

can be implemented by any technical method for applied purposes;

can be applied in all other embodiments without any restrictions if the need to manage and use user calling accounts is required.

Authentication and Indication of Kaller App Functionality Vis-a-Vis the Internet Connection Applied technologies allow the mobile app to provide an online check of the presence of an internet connection between the app and the server. Likewise, technologies for examining the quality of the established connection are known in the art. In order to check the quality of the established connection, the app (or server) initiates a session between the app and the server, exchanging various metadata which allows the app and/or server to analyze the connection quality and diagnose if the quality of the connection is of a sufficient quality to provide proper app functionality or not.

In order to prevent overloading the application, and depending on the specifications, characteristics and/or quality of the established connection between app and the server, the system can perform quality checks according to an online regime or at predetermined time intervals. The technological capabilities of the specific device will influence how the online check is performed.

For example, in a preferred embodiment, the quality checks are realized according to an "on demand" basis. As such, when a user finishes entering a phone number on the dialer (or selects a contact), and the intended recipient calling account is registered as a member of the KALLER system and has the instant app installed on his or her device, the system server performs a quality check in preparation of initiating the communication session.

Based on the quality check, the app is able verify various issues. As mentioned, the quality check indicates whether there is a sufficiently good internet connection for a given threshold of functionality. The check can verify whether the recipient has the instant app installed on the device. Furthermore, the check verifies whether the user app is in an active state. Still further the online check confirms/indicates whether the intended recipient application is in an active state.

If the user and recipient apps are both active, and the internet connection is of a sufficiently good quality, then KALLER to KALLER, (K2K) communications can be provided, such an availability may be indicated by an icon (e.g. "online/offline") or in any other manner.

FIG. 7 is a screenshot of a contact profile page. The screenshot shows the contact and indicates that (K2K) communications can be provided to the contact's KALLER app, that is associated the contact's phone number (A) which is shown as being "online" and cannot be provided to the contact's KALLER app that is associated to contact's phone number (B) which is shown as being "offline" and is grayed out.

In some configurations, there may be an indicator on the contact entry indicating whether the contact device has a system app installed thereon (e.g. the KALLER app logo on the avatar/image of the contact). FIGS. 7, 8, 9, 10 is a screenshot of a "contact's profile", Contacts, History and Favorites pages indicating that contacts has the KALLER app installed. In an alternative configuration, KALLER app logo on the avatar/image of the contact can be colored differently depending on the status of the app on the device, e.g. KALLER app logo can be colored blue/green indicating that contact KALLER app is in active state and colored red or gray if not.

Figure 11:
FIG. 11 is a screenshot of the DIALER page with an APP active state indicator in the app header next to the app logo.

In some configurations, the app header may have an indicator that reflects the status of the online connection (e.g. green for connection that quality enough to provide proper app functionality, and red for no such a connection). FIG. 11 is a screenshot of a dialer page with an active state indicator (see A) in the app header next to the app logo.

Figure 12:
FIG. 12 is a screenshot of smartphone with an KALLER APP state indicator in the device status bar.

In an alternative configuration, the indicator can be implemented as an indicator that reflects the status of the online connection or as a specific icon on device status bar or top menu. FIG. 12 (see A) is a screenshot of smartphone with a blue/red KALLER logo indicator in the device status bar.

In summary, there is disclosed a mobile telecommunications system, including: a telecommunications server in electronic communication with a network of computers (Public Internet), a first subscriber device subscribed to the telecommunications server and configured to effect a communication event (voice call or messaging event) via the server to other devices. There is a target device (either a another subscriber device or a non-subscriber device on the PSTN/GSM network) and the communication event that is effected between the first subscriber device and the target device (through the telecommunications server) is billed at a uniform tariff (e.g. a flat rate for all participating countries which also includes a free tariff, which is another example of a uniform tariff). In one embodiment the target device is a public switched telephone network (PSTN) device. In another embodiment the target device is a second subscriber device subscribed to tele-/communications server. In such a case, the first and second subscriber devices have instances of a mobile application installed thereon. The mobile application is configured to facilitate voice over internet protocol (VOIP) communications or a messaging event between the first and second subscriber devices through the telecommunications server and internet.

In one embodiment, the mobile application is configured to display a graphic indicator on each of first and second subscriber devices indicating a respective state of connectivity between the first subscriber device and the server and between the second subscriber device and the telecommunications server. In one embodiment, a lack of connectivity between the first subscriber device and the telecommunications server is indicated by a first variation of indicator (e.g. an offline icon that is a gray color). In embodiments, connectivity between the first subscriber device and the telecommunications server is indicated by a second variation of the indicator (e.g. a green colored circle displayed in the header or notification bar). In embodiments, connectivity between the first subscriber device and the telecommunications server and the second subscriber device and the telecommunications server is indicated by a third variation of the indicator (e.g. a green "online" icon). The online/offline indicator may be displayed on the mobile device relative to an activatable user interface element associated with the second subscriber device (e.g. a button or tile etc. of the user contact).

Health Protection

In some embodiments, the KALLER APP provides a connection quality diagnostic, and also defines the type of internet used, i.e. whether over Wi-Fi or mobile internet over GSM.

So, if KALLER APP verified that the quality of established connection over Wi-Fi internet is enough to provide proper app functionality, KALLER APP is able to provide the user with a "Healthy Talk" operating regime by simply switching off the GSM antenna that is not being used.

In this manner the KALLER APP provides an original method for reducing electromagnetic emissions of a smartphone, thereby protecting the user by neutralizing the GSM antenna activity, which outputs the most harmful emissions, and connecting to the internet over Wi-Fi which outputs much less radiation.

Methods for Initiating Calls

Hereafter are presented preferred, albeit exemplary, embodiments for implementing an advanced multifunctional dialer KALLER. Explanations provided hereafter are merely illustrative in order to demonstrate the simplicity of using multiple calling accounts and using "multifunctional" buttons implemented in interfaces that are traditionally used for native dialers and are familiar to users. The description focused on features that are innovative, valuable and widely used in the KALLER APP. While the invention has been described with respect to a limited number of embodiments, it will be appreciated that many variations, modifications and other applications of the invention may be made.

On the DIALER page of the KALLER APP, the user can make a call from the user calling account that has been set as the default calling account or by using any other user calling account, as described presently.

Figure 14:
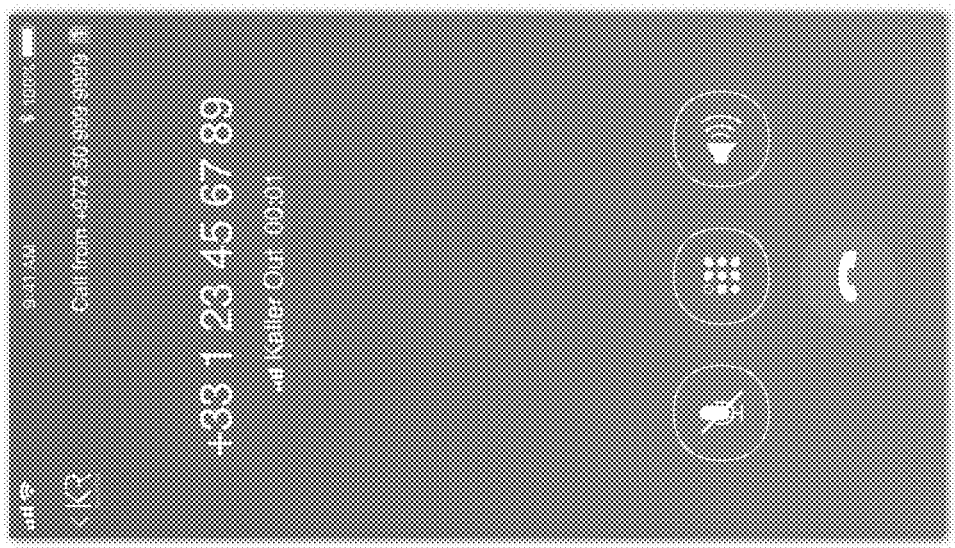
Figure 13:
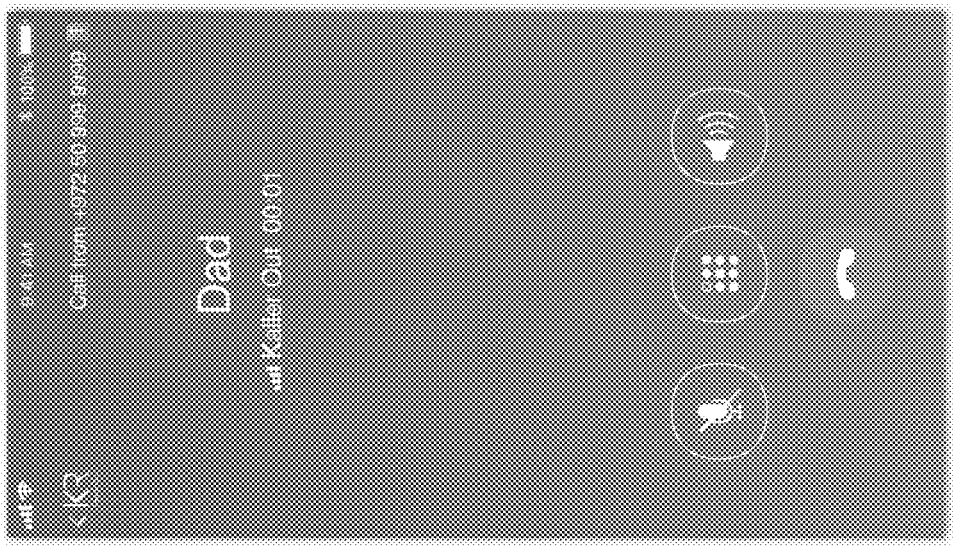
Figure 16:
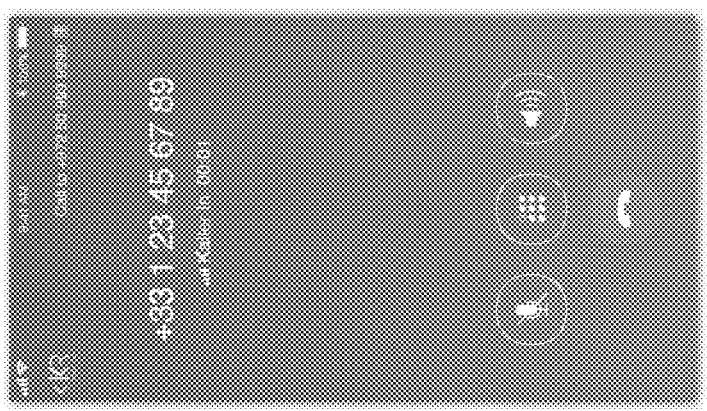
Figure 17:
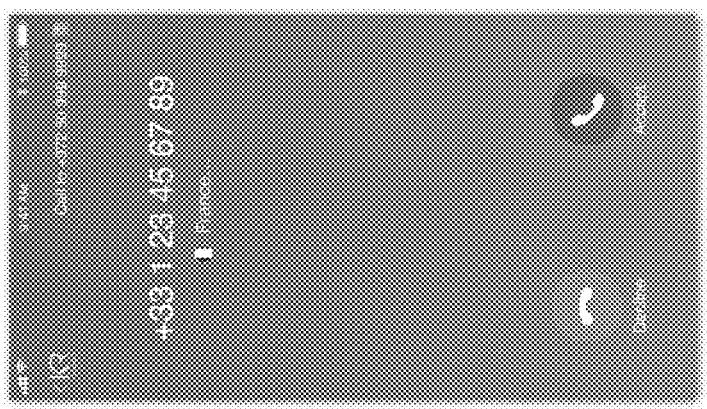
Figure 18:
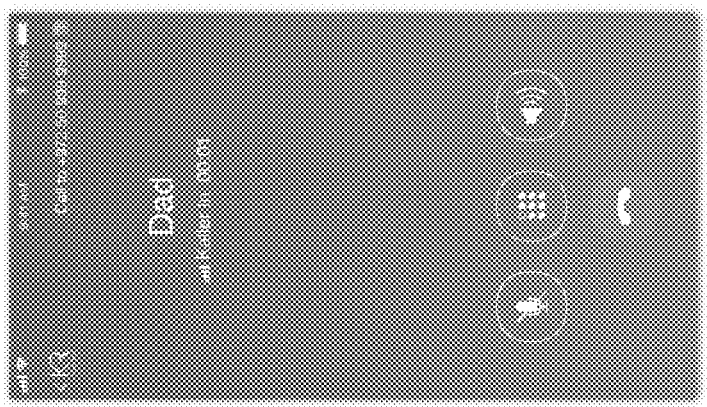

On the KALLER APP DIALER page, the "Enter/Dial" button (see FIG. 6A, the button with the representation of a handset is the activation or enter/dial button and is highlighted in the figure by a circle) is a multifunctional button. The user initiates a call to a PSTN network recipient using the default calling account by initiating a "basic" multifunctional button action, e.g. by clicking on the "Enter/Dial" button (see MULTIFUNCTIONAL INTERFACE BUTTONS). When initiating a call using the described method, the "default" calling account (name and/or number of the account) will be indicated on the "CALLING" screen (see FIG. 13 or FIG. 14 where the recipient phone number has not been previously recorded in the user's address book) and will be indicated to the call recipient as the user's outbound phone number.

The KALLER APP user is able to initiate a phone call to a PSTN network recipient using any of the other calling accounts by initiating an "advanced" multifunctional button user action to actuate an multifunctional button, e.g. by long press on the "Enter/Dial" button (see MULTIFUNCTIONAL INTERFACE BUTTONS). Executing an "advanced" multifunctional "Enter/Dial" button action on the KALLER APP invokes a sub menu (see FIG. 6C) that represents all the user calling accounts. The user initiates a call by choosing one of the user calling accounts by clicking on one of them.

When initiating a call using the described method, the selected calling account will be indicated on the "CALLING" screen and will be indicated to the recipient as user's outbound phone number.

Hereafter is described the use of the KALLER application HISTORY page and "history call log" buttons for making a call to a subscriber phone number that has been recorded on a specific "call log", using a user calling account that been used for the specific "call log" or by using any other user calling account. FIG. 8 is a screenshot of an exemplary HISTORY page of the app.

On the KALLER APP HISTORY page, the "history call log" buttons are multifunctional. Therefore, to initiate a call to the subscriber's phone number as recorded on a specific "call log", using calling account that been used for the specific "call log", the user initiates a "basic" multifunctional button action, e.g. by clicking on the specific "call log" button.

In this exemplary use of a multifunctional button, "basic" multifunctional button action use to initiate a call, using calling account that been used for the specific "call log", but not a "default calling account. Simply saying this method allowing "call back" from calling account that been used.

When initiating a call using the described method, the calling account that been used for the specific "call log" calling account will be indicated as an icon on the "CALLING" screen and will be indicated to the call recipient as the user's outbound phone number.

Alternatively, the user is able to initiate a call to the subscriber phone number recorded on a specific "call log", using any of the user calling accounts, by effecting an "advanced" multifunctional button action, e.g. a long press on the specific "call log" button. Initiating an "advanced" multifunctional "call log" button action, KALLER APP invokes a sub menu (see FIG. 6C) that presents the user calling accounts, allowing user to choose one of the user calling accounts by clicking on one of them.

When initiating a call using the described method, the selected calling account will be indicated on the "CALLING" screen and will be indicated to the call recipient as user's outbound phone number.

Hereafter is described the KALLER APP, CONTACTS page, "specific subscriber" buttons, and making a call to the current subscriber phone number. In one embodiment, the functionality to initiate a phone call using specific subscriber buttons is not enabled, in order to prevent the user from making an incidental call by randomly touching a specific subscriber button, e.g. during a search through the Contacts list. In such an embodiment, the subscriber buttons are enabled/predefined to invoke the INFO (contact profile) page of the specific subscriber.

In another embodiment, the specific subscriber buttons are "enabled" as "multifunctional" buttons, allowing the user to initiate a call using method as described below for the FAVORITES page. FIG. 9 is a screenshot of a Contacts page.

Hereafter, use of the KALLER APP, FAVORITES page is described. In one exemplary embodiment, subscribers can be selected as "favorites" and one of specific subscriber phone numbers can be set as a default calling account, e.g. by using options provided on the INFO (contact profile) page, (FIG. 7). FIG. 10 is a screenshot of a Favorites page, with a specific subscriber button highlighted and the Info icon highlighted.

Preferably, "specific subscriber" buttons on the KALLER APP, FAVORITES page, are enabled as a multifunctional buttons. As such, the user is able to initiate a call to the subscriber phone number set as default, from the user default calling account, by effecting a "basic" multifunctional button action, e.g. by clicking on one of the "specific subscriber" buttons (see MULTIFUNCTIONAL INTERFACE BUTTONS).

When initiating a call using the aforementioned method, the default user calling account will be indicated on the "CALLING" screen and will be indicated to call recipient as user's outbound phone number.

A user is able to initiate a call to the subscriber phone number, using any of the user calling accounts, by effecting an "advanced" multifunctional button action, e.g. a long press on one of the "specific subscriber" buttons (see MULTIFUNCTIONAL INTERFACE BUTTONS). Initiating an "advanced" multifunctional button action on a "specific subscriber" button invokes/provides a sub menu see FIG. 6C) that presents the user calling accounts, allowing the user to select one of the user calling accounts by clicking on one of them.

Initiating a call using described method, "chosen" calling account will be indicated on the "CALLING" screen and will be indicated to call recipient as user's outbound phone number. Hereafter is described the KALLER application, specific subscriber INFO (contact's profile) page, how to make a call to a subscriber phone numbers, using a user calling account set as the default calling account or by using another user calling account.

The "subscriber phone number" buttons on the KALLER APP, INFO (contact's profile) page (see FIG. 7) are configured as multifunctional buttons. A KALLER APP user is able to initiate a call to the default subscriber phone number, from the default user calling account, by effecting a "basic" multifunctional button action, e.g. by clicking on one of the "subscriber phone number" buttons (see MULTIFUNCTIONAL INTERFACE BUTTONS).

When initiating a call using the described method, the default calling account (name and/or number) will be indicated on the "CALLING" screen and will be indicated to call recipient as user's outbound phone number.

KALLER APP user able to initiate a call to the subscriber phone number, using any of the user calling accounts, by initiating an "advanced" multifunctional button action, e.g. a long press on one of the "subscriber phone number" buttons (see MULTIFUNCTIONAL INTERFACE BUTTONS).

Initiating an "advanced" multifunctional "subscriber phone number" buttons action, KALLER APP invokes/provides a sub menu (FIG. 6C), that represents user's calling accounts, allowing user to initiate a call choosing and using one of the user's calling accounts by clicking on one of them.

Initiating a call using described method, "chosen" calling account will be indicated on the "CALLING" screen and will be indicated to call recipient as user's outbound phone number.

In embodiments, the user can be redirected to the INFO (contact's profile) page by clicking a Info icon "(i)" button located in the individual fields of the contacts/recipients on the HISTORY, and FAVORITES pages of the KALLER APP (see for example the circled (i) icon in FIG. 10), or using the KALLER APP, CONTACTS page, "specific subscriber" buttons that function as (i) "Info" buttons.

Hereafter is described a method of making KALLER APP to KALLER APP, "K2K" communications. As been described above, the KALLER server is able to verify whether the user KALLER APP and specific subscriber KALLER APP are in active state so that KALLER APP to KALLER APP, "K2K" communications can be carried out online. In preferred embodiments, if "K2K" communications can be provided, the KALLER server automatically redirects communications (phone calls) from the subscriber PSTN phone number to the subscriber KALLER APP, thereby automatically establishing a "K2K" communication. In other embodiments, for the same conditions described heretofore, the KALLER APP can offer to establish a "K2K" communication, or at least ask the user to confirm establishing the same, instead of automatic redirection.

Figure 15:
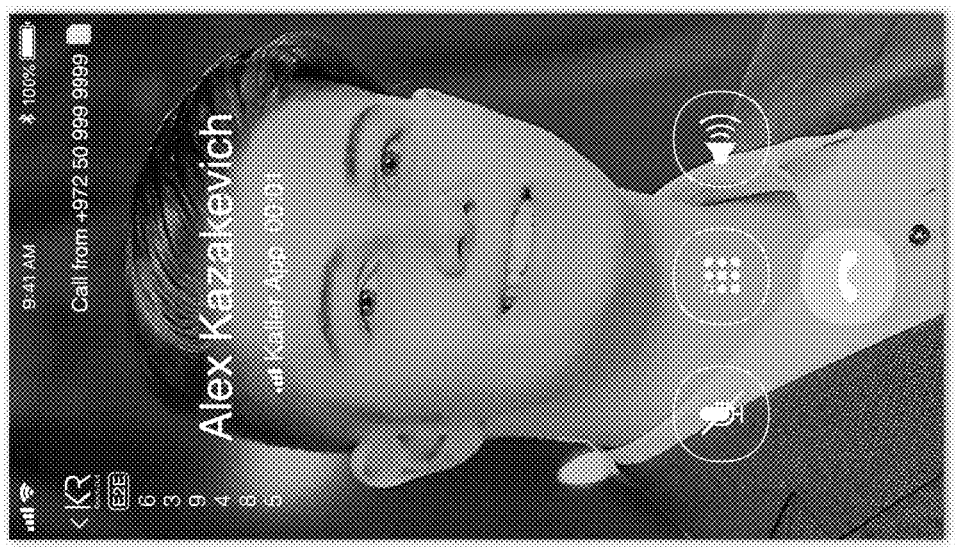
FIG. 13-21 are screenshots of the CALLING screens in different scenarios.

Initiating a call by using a "K2K" communication, used calling account will be indicated on the "CALLING" screen as well as recipient's phone number assigned to the recipient's KALLER APP, that used for the current call. Initiating a call by using a "KALLER APP to KALLER APP" communication, such calls will be indicated on the "CALLING" screen as "Kaller app" (see FIG. 15) but not as "KallerOut" as for calls "KALLER APP to PSTN network recipients".

Hereafter is described the general method for providing "voice" and "messaging" functionalities on the KALLER APP. The preferred embodiments described herein have focused, to a large degree, on the description of calling or "voice" functionality. The instant app is further designed to provide "messaging" communications by using "multifunctional" buttons which afford advance messaging capabilities, such as allowing the user to initiate "messaging" communications using the same methods as described above for "voice" communications.

Conversely, pages designed specially to provide a "messaging" functionality, e.g. a CHAT page, can be used to initiate "voice" communications, e.g. by using "multifunctional" buttons capabilities as described above for voice calls.

Methods for Receiving Calls

Figure 21:
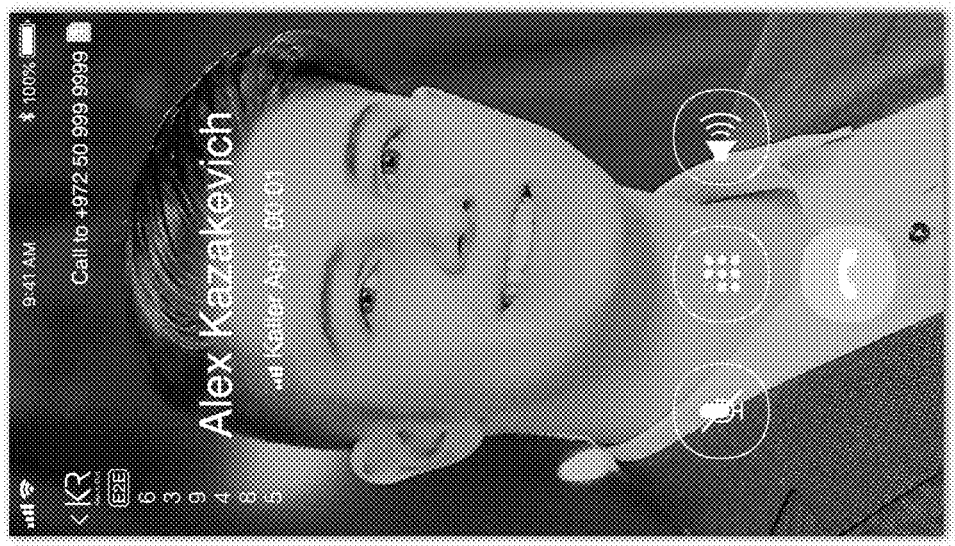

When the Kaller app verifies that app is in an active state and the quality of connection to the Kaller server is sufficient to provide proper functionality, all incoming calls to any of the calling accounts of the user are redirected to the app. Incoming calls invoke an "incoming call screen", allowing user to accept or decline a call. Innovatively, the "incoming call" screen provides additional information, for example, one or more of: the calling account that is used to receive the call; the outbound phone number of the subscriber and country of origin of the subscriber; if the subscriber is recorded in the user contacts then the subscriber name and the name of the subscriber phone number (if more than one, as recorded in a user phone book) from which the call was initiated; and the type of received call, e.g. KALLER IN (see FIGS. 16, 17 or FIGS. 18, 19 where the recipient's phone number has not been previously recorded in the user's address book) or "KALLER APP" if the call was made using "K2K" communication (see FIG. 20-21).

If the app discovers that Kaller app of the user is not able to provide proper functionality, then, in preferred embodiments, all incoming calls to the user's calling accounts that are associated to the SIM card inserted to the user's smartphone are automatically redirected to the GSM network so that the user is nonetheless able to receive calls using cellular service from SIM card provider.

In preferred embodiments, an incoming call to another user calling account is recorded in the "history call logs", KALLER APP, HISTORY page as a "missed" call. In other embodiments, incoming calls to other user calling accounts can be recorded in "voice mail" by an "answering machine". In other embodiments, incoming calls to other user calling accounts can be redirected back to GSM networks provided by other user calling accounts associated to the SIM cards, even when the calling account is not associated with the SIM card in the device.

Integration of "Voice" and "Messaging" Functionalities

The long evolution of the development of native dialers and native messengers (SMS) eventually led to the full integration of these two functionalities in a practical and convenient manner. Unfortunately, the integration of the functionalities was destroyed by the independent development of the "third party" (not operational systems) "messenger" application and the rejection or failure of smartphone operating systems developers to provide the necessary integration with such "messenger" applications. Practically, third party messenger apps require the user to develop new habits and experience for each specific application, habits that are absolutely different from native dialer user experience.

The instant application is designed as a technological development of the native dialers by integrating advanced functionalities of the "voice" communications and messaging communications in one application, on a single device, without the need for users to change habits already formed by using the native dialers and by the operating systems interfaces of the smartphone.

Furthermore, the instant application is innovatively structured to provide users with enhanced access to smartphone capabilities such as the use of the multiple calling accounts both for the voice and messaging communications. Such capabilities are absent from native messengers (SMS) and "third party" messenger applications do not adequately support the management of multiple calling accounts.

The instant, exemplary KALLER APP is designed as an advanced multifunctional dialer, able to combine and provide capabilities for "voice" communications, such as phone calls, and "messaging" communications, such as text chats, video conference, video chats, image transferring and sharing, etc., by using multiple calling accounts, managed by the application, all on a single device.

In embodiments, the KALLER APP is able to provide fully functional "messaging" communications when the user KALLER APP and a subscriber KALLER APP are in an active state, thereby affording "K2K", KALLER APP to KALLER APP communications.

Used technologies allow to KALLER to provide a "limited" functionality if "K2K" communication not available. Such a "limited" functionality can be represented as sending an SMS message to a "messaging" communication recipient instead of a KALLER text chat if "K2K" communication is not available.

Preferred KALLER Business Model

According to a preferred embodiment there is provided a business scheme/model of a financial relationship of the KALLER infrastructure provider with KALLER APP users and PSTN network infrastructure providers. In one embodiment, KALLER APP users are charged a flat rate/one price per minute call to any of destinations, countries, serviced by the KALLER system.

Another preferred business scheme/model is based on maintaining a positive balance formed by/of the income (cash flow) received from "paying" KALLER APP users and expenses paid to PSTN network carriers for providing a service, KALLER infrastructure operational cost.

As previously described, KALLER infrastructure and KALLER APP afford users phone calls according to the "KALLER APP to KALLER APP", "K2K" as well as KALLER APP to PSTN network recipient. K2K calls only use KALLER infrastructure and a connection to the internet. For "KALLER APP to PSTN network recipient" communications a PSTN network infrastructure and service provider are needed for connecting to the call on the PSTN side, call redirection, DID numbers provision, etc.

Therefore, in order to provide fully functional services, KALLER infrastructure has operating agreements with PSTN networks providers that provide the required services. Simplistically, KALLER contracts with PSTN network operators, local mobile operators in selected countries or/and roaming zones. The KALLER contract with the PSTN network includes purchasing packages of minutes/"airtime" at a wholesale price.

In preferred embodiments, countries are selected based on the ability of KALLER infrastructure provider to buy "minutes" in the specific country at such a price that allows resale of the minutes the app users at a "flat rate" while maintaining a positive balance sheet.

For similar reasons, the KALLER infrastructure provider contracts with the selected countries/PSTN networks, to purchase airtime according to airtime consumption of the app users. The KALLER billing server automatically monitors compliance with the balance of spending "minutes" in different countries and in the event of a shortage of minutes in some of the countries, automatically buys additional "minutes".

Figure 19:
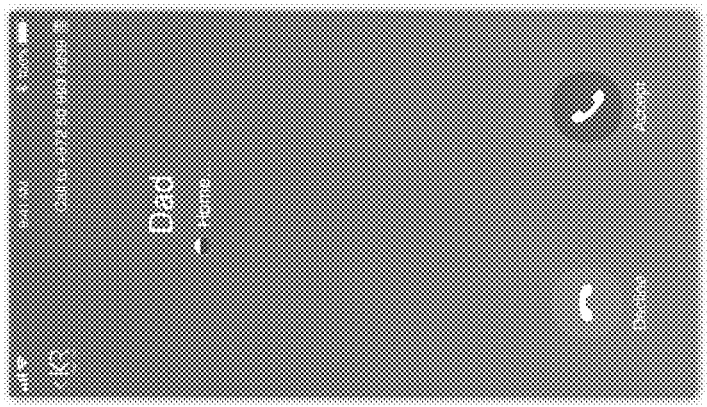
Figure 20:
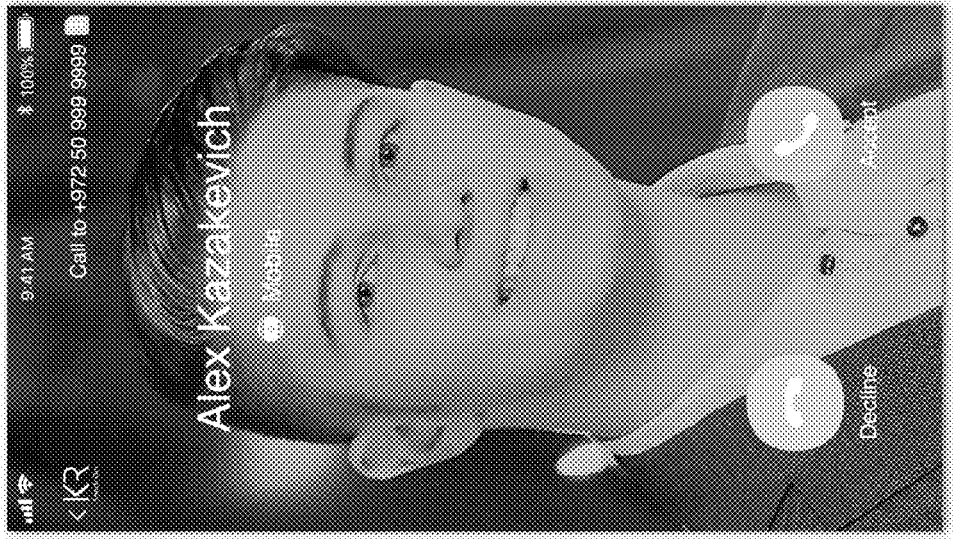

In preferred embodiments, the KALLER APP provides users with two types of calls: "K2K" calls, that are free for users and "KALLER APP to PSTN network recipient" that are available only for "paying" users. In preferred embodiments, the KALLER APP provides users with two types of payment plans: "Pay as use" and monthly subscription. FIG. 19 is a screenshot of an exemplary Account and Billing page.

Figure 22:
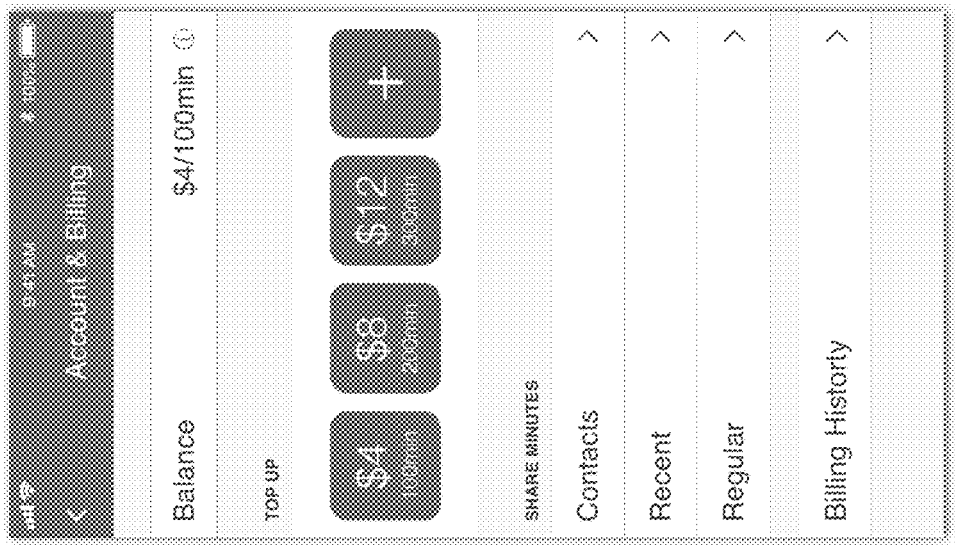
FIG. 22 is a screenshot of an exemplary Account and Billing page.

The "Pay as use" plan provides with the following conditions: KALLER APP user is able to get KALLER APP "minutes packages", purchasing credit via KALLER APP billing interface, for example in multiples of $4 e.g. $4, $8, $12, etc. as shown in the screenshot of FIG. 22. The "minutes package" provides a predetermined duration and amount of communication events (voice calls and messaging events). The "minutes package" is consumed as the minutes are used by the user. There is an option of activating credit auto recharge from a provided credit card.

The "Monthly subscription" plan has the same conditions as the "Pay as use" plan but minutes packages can only be used within a one month of purchasing date. The "Monthly subscription" plan provides users some additional minutes as a bonus that can be valuable for family or for business use. As previously mentioned, KALLER APP provides users with a flat rate, same rate for the calls to any of countries, serviced by the KALLER system.

In the event that some of the countries serviced by the KALLER system have "roaming" calls rates that are dramatically lower than the KALLER APP flat rate, KALLER APP able to promote special (discounted) rates for specific countries. In a preferred embodiment, the KALLER APP provides users a flat rate, one price (e.g. 4 cents) per one minute to call any of the countries, serviced by KALLER.

In a preferred embodiment, KALLER APP provides users an ability to use "minutes" as an internal KALLER APP "value" that can also be represented as a "KALLER digital currency" securely tied to the "KALLER APP calling account" that uses it.

In another embodiment such a "digital currency" can be converted and transferred to the user's "money" account, according the application provider's rules and conditions.

In another embodiment such a "digital currency" can be transformed to another "values" provided by the application provider e.g. can be converted internet traffic that can be used by the supported SIM cards.

In other embodiments user "minutes" account can be use different, not limited by the described above.

In a preferred embodiment, KALLER APP provides extra features such as an ability to transfer or share a "minutes package" or part thereof, with other KALLER APP users/KALLER APP calling accounts (see FIG. 22.). That is to say that a minutes package of part thereof can be transferred to a second calling account selected from the calling accounts on the same device or to a second calling account located on a second mobile device. For example, this option can be used to share KALLER APP user's "minutes" account with family members or for business needs or just to transfer some "minutes" to another KALLER APP/KALLER APP calling account if needed.

The benefits provided by the presented preferred business model for the KALLER APP users includes: (a) providing users with a list of countries that KALLER service provides; (b) providing users with a "clear" and "flat" calling rate; (c) providing users with a clear payment service; (d) providing users with confidence/assurance of impossibility of any unpredictable expenses when using a KALLER APP; (e) save users from the complexities of making a decision whether to make a roaming call as exists today, e.g. to make a call using GSM cellular network, or to use some random third party calling service and the like.

Having such a "clear" service approach, KALLER APP users can make calls without thinking "to call or not to call", that is what makes the KALLER APP unique and really user friendly.

In other embodiments another business models KALLER provider may receive charges from telephony infrastructure service companies such as carriers, aggregators, etc. for using a KALLER infrastructure Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

An Input/Output subsystem of the mobile device can include a touch screen controller and/or other input controller(s). The touch-screen controller can be coupled to a touch screen. The touch screen and touch screen controller can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen.

Embodiments of the subject matter described in this specification can be implemented as one or more computer programs, i.e., one or more modules of computer program instructions encoded on a tangible non-transitory computer storage medium for execution by, or to control the operation of, data processing apparatus. The computer storage medium can be a machine-readable storage device, a machine-readable storage substrate, a random or serial access memory device, or a combination of one or more of them. The computer program may include multiple files, and may be deployed to execute one or more data processing apparatus.

The terms "data processing apparatus", "processing unit", "processor" and similar terms or variations thereof encompass all kinds of apparatus, devices, and machines for processing data, including by way of example a programmable processor, a computer, special-purpose circuitry, or multiple processors or computers. The apparatus can also include, in addition to hardware, code that creates an execution environment for the computer program in question, e.g., code that constitutes processor firmware, a protocol stack, a database management system, an operating system, or a combination of one or more of them.

The processes and logic flows described in this specification can be performed by one or more programmable computers executing one or more computer programs to perform functions by operating on input data and generating output, or one or more special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A software application embodied in a non-transitory computer readable medium, comprising:
   code instructions for utilization of a plurality of distinct public switched telephone network (PSTN) numbers with a mobile device, by prompting a user to create a plurality of calling accounts, each calling account comprising at least a textual identifier and a distinct PSTN number, and for storing of a plurality of said calling accounts for use within the mobile device, wherein each distinct PSTN number is a number associated with a subscriber identity module (SIM) card, a direct inward dial number, or a landline phone number;
   code instructions for choosing from among the plurality of calling accounts for originating a communication event using the mobile device, and for indicating the chosen calling account as an origin of the communication event, wherein each of the plurality of calling accounts is available to be chosen regardless of whether its PSTN number is associated with a hardware component configured within the mobile device to identify the mobile device during a communication event
   wherein each of the calling accounts is configured to utilize the hardware component during a communication event, and switching between different calling accounts is performed without changing the same component;

and code instructions for displaying a graphical user interface (GUI), the GUI comprising:
at least one multifunctional graphic user interface element having at least two activation states:
(i) a first state, when actuated, providing a basic function, and
(ii) a second state, when actuated, providing an advanced function; whereby each of said activation states is actuated by a different user action;
wherein said at least one multifunctional graphic user interface element is configured to facilitate selection of one of said plurality of calling accounts in order to intitiate the communication event with the selected calling account.

2. The software application of claim 1, wherein said communication event is one of a voice call or a messaging event, wherein the messaging event comprises a form of communication that is not a voice call.

3. The software application of claim 2, wherein actuation of said first state of said at least one multifunctional graphic user interface element selects a default calling account of said plurality of calling accounts and actuation of said second state of said at least one multifunctional graphic user interface element is configured to present a list of said plurality of calling accounts for selection therefrom.

4. The software application of claim 3, wherein said list further includes an additional graphic user interface element, wherein selection of one of the plurality of calling accounts initiates a first type of communication to be sent from the selected calling account, and wherein selection of said additional graphic user interface element prompts presentation of a second list including said plurality of calling accounts such that selection of one of said calling accounts from said second list results in initiation of a second type of communication event to be sent from said selected calling account.

5. The software application of claim 2, wherein said communication event is a messaging event, and selection of one of said calling accounts from said list results in initiation of said messaging event to be sent from said selected calling account.

6. The software application of claim 2, wherein said communication event is a voice call, and selection of one of said calling accounts from said list results in initiation of said voice call from said selected calling account.

7. The software application of claim 6, wherein the GUI comprises a telephone keypad, and the multifunctional graphic user interface element comprises a graphic user interface element within the telephone keypad associated with sending a call.

8. A software application embodied in a non-transitory computer medium, comprising:
code instructions for utilization of a plurality of distinct public switched telephone network (PSTN) numbers with a mobile device, by prompting a user to create a plurality of calling accounts, each calling account comprising at least a textual identifier and a distinct PSTN number, and for storing a plurality of said calling accounts for use within the mobile device, wherein each distinct PSTN number is a number associated with a subscriber identity module (SIM) card, a direct inward dial number, or a landline phone number;
code instructions for choosing from among the plurality of calling accounts for originating a communication event using the mobile device, and for indicating the chosen calling account as an origin of the communication event, wherein each of the plurality of calling accounts is available to be chosen regardless of whether its PSTN number is associated with a hardware component configured within the mobile device to identify the mobile device during a communication event;
wherein each of the calling accounts is configured to utilize the hardware component during a communication event, and switching between different calling accounts is performed without changing the same component; and
code instructions for displaying a graphical user interface comprising:
a graphic user interface element configured to facilitate selection of one of said plurality of calling accounts in order to perform a communication event with the selected calling account using the mobile device; and
a user calling account bar, the user calling account bar configured to display a default calling account, and wherein actuation of the user calling account bar is configured to present a list of said plurality of calling accounts for selection of the default calling account therefrom.

9. The software application of claim 8, wherein selecting a displayed calling account in its position in the list of said plurality of calling accounts causes selection of the selected calling account as the default calling account.

10. The software application of claim 8, wherein the user calling account bar is located at a top edge of the GUI.

11. The software application of claim 8, wherein the graphic user interface element is a multifunctional graphic user interface element having at least two activation states:
(i) a first state, when actuated, providing a basic function, and
(ii) a second state, when actuated, providing an advanced function; whereby each of said activation states is actuated by a different user action;
wherein the basic function is performance of the communication event with the default calling account, and the advanced function is presentation of a list of said plurality of calling accounts for selection therefrom.

12. The software application of claim 8, wherein said communication event is one of a voice call or a messaging event, wherein the messaging event comprises a form of communication that is not a voice call.

* * * * *